United States Patent
Dadey et al.

(10) Patent No.: US 10,686,650 B2
(45) Date of Patent: Jun. 16, 2020

(54) STACK LINK FAULT RESPONSE SYSTEM

(71) Applicant: Dell Products L.P., Round Rock, TX (US)

(72) Inventors: Dennis R. Dadey, Cedar Park, TX (US); Avinash Jayakumar, Tamil Nadu (IN)

(73) Assignee: Dell Products L.P., Round Rock, TX (US)

(*) Notice: Subject to any disclaimer, the term of this patent is extended or adjusted under 35 U.S.C. 154(b) by 97 days.

(21) Appl. No.: 15/710,624

(22) Filed: Sep. 20, 2017

(65) Prior Publication Data

US 2019/0089578 A1    Mar. 21, 2019

(51) Int. Cl.
| | |
|---|---|
| *H04L 12/24* | (2006.01) |
| *H04L 12/703* | (2013.01) |
| *H04L 12/939* | (2013.01) |
| *H04L 12/26* | (2006.01) |
| H04L 12/931 | (2013.01) |

(52) U.S. Cl.
CPC ...... *H04L 41/0668* (2013.01); *H04L 41/0659* (2013.01); *H04L 43/0811* (2013.01); *H04L 43/0817* (2013.01); *H04L 45/28* (2013.01); *H04L 49/555* (2013.01); *H04L 49/205* (2013.01)

(58) Field of Classification Search
CPC . H04L 41/0668; H04L 43/0817; H04L 45/28; H04L 49/555
See application file for complete search history.

(56) References Cited

U.S. PATENT DOCUMENTS

| | | | | |
|---|---|---|---|---|
| 2002/0004843 | A1* | 1/2002 | Andersson | H04L 45/00 709/238 |
| 2003/0212784 | A1* | 11/2003 | Nguyen | G06F 11/328 709/224 |
| 2004/0218548 | A1* | 11/2004 | Kennedy | H04L 1/1685 370/254 |
| 2005/0265330 | A1* | 12/2005 | Suzuki | H04L 49/555 370/389 |
| 2008/0232375 | A1* | 9/2008 | Hachiya | H04L 43/00 370/392 |
| 2009/0268609 | A1* | 10/2009 | Koch | H04L 12/423 370/222 |
| 2009/0316574 | A1* | 12/2009 | Winter | H04L 45/00 370/225 |
| 2010/0124196 | A1* | 5/2010 | Bonar | H04B 7/0689 370/329 |

(Continued)

*Primary Examiner* — Jael M Ulysse
(74) *Attorney, Agent, or Firm* — Haynes and Boone, LLP

(57) ABSTRACT

A stack link fault response system includes a connected device, a first networking device, and a second networking device that is coupled to the connected device by first connected device link(s), and to the first networking device by stack links. The second networking device uses the stack links to transmit connected device communications received through the first connected device link(s) from the connected device. When the second networking device determines that a subset of the stack links are unavailable to transmit communications while at least one of the stack links is available to transmit communications, it performs a stack link fault response action that is configured to prevent the connected device from sending at least a portion of the connected device communications through the first connected device link(s) to the second networking device.

20 Claims, 13 Drawing Sheets

(56) References Cited

U.S. PATENT DOCUMENTS

| | | | |
|---|---|---|---|
| 2010/0153787 A1* | 6/2010 | Beattie, Jr. | H04L 41/0681 714/43 |
| 2010/0189113 A1* | 7/2010 | Csaszar | H04L 45/00 370/400 |
| 2010/0205260 A1* | 8/2010 | Daskalopoulos | H04L 12/1836 709/206 |
| 2010/0290778 A1* | 11/2010 | Nishioka | H04L 41/0672 398/2 |
| 2010/0325257 A1* | 12/2010 | Goel | H04L 29/12028 709/223 |
| 2011/0211585 A1* | 9/2011 | Kodaka | H04L 45/00 370/401 |
| 2012/0044813 A1* | 2/2012 | Nandagopal | H04L 45/28 370/242 |
| 2012/0106322 A1* | 5/2012 | Gero | H04L 12/437 370/225 |
| 2013/0073711 A1* | 3/2013 | Hanka | H04L 45/58 709/223 |
| 2013/0336104 A1* | 12/2013 | Talla | H04L 45/245 370/216 |
| 2014/0269266 A1* | 9/2014 | Filsfils | H04L 43/50 370/228 |
| 2014/0376370 A1* | 12/2014 | Cioffi | H04L 61/2514 370/230 |
| 2015/0142970 A1* | 5/2015 | Callaghan | H04L 1/244 709/224 |
| 2015/0288559 A1* | 10/2015 | Yasuda | H04L 41/0654 370/217 |
| 2015/0312088 A1* | 10/2015 | Ramakrishnan | H04L 41/0654 370/218 |
| 2016/0099862 A1* | 4/2016 | Stellick | H04L 45/28 709/223 |
| 2016/0241463 A1* | 8/2016 | D'Souza | H04L 45/28 |
| 2017/0324628 A1* | 11/2017 | Dhanabalan | H04L 47/24 |

\* cited by examiner

STACK LINK FAULT RESPONSE SYSTEM

BACKGROUND

The present disclosure relates generally to information handling systems, and more particularly to responding to faults in stack links between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networking information handling systems such as, for example, switch devices, are sometimes "stacked" or otherwise connected together in order to provide enhanced functionality. For example, multiple switch devices stacked together may operate as a single, logical switch device that has a port capacity of the sum of the multiple switch devices, and that provides for simplified network administration, resilient connections, networking scaling, and a variety of other benefits. When stacking switch devices, one or more stack ports on each switch device may be coupled to one or more stack ports on at least one other switch device to provide one or more stack links that form an Inter-Switch Link (ISL) between those switch devices. However, in the event a subset of the stack links in an ISL between switch devices fail, that ISL may experience degraded performance, bandwidth, or connectivity. However, devices communicating via those switch devices (e.g., server devices, storage devices, and/or other connected devices known in the art) will be unaware of the degraded ISL, as conventional stacked systems report the ISL as either "up" (i.e., available to transmit communications) or "down" (i.e., unavailable to transmit communications), which may result in a communications failure. To provide a specific example, a conventional stacked system may include a first switch device and a second switch device connected via an ISL with four stack links. If three of the four stack links fail, a server device connected to the first switch device or second switch device will still see the ISL as "up" or otherwise available to transmit communications, even though that ISL performance, bandwidth, or other connectivity may be substantially degraded, which may cause communications sent by that server device to be dropped.

Accordingly, it would be desirable to provide an improved stack link fault response system.

SUMMARY

According to one embodiment, an Information Handling System (IHS) includes at least one first connected device port that is configured to couple to a connected device; a plurality of stack ports that are configured to couple to at least one networking device; a processing system that is coupled to the at least one first connected device port and the plurality of stack ports; and a memory system that is coupled to the processing system and that includes instructions that, when executed by the processing system, cause the processing system to provide a stack link fault response engine that is configured to: transmit, using at least one of a plurality of stack links provided by the plurality of stack ports, connected device communications received through the at least one first connected device port from the connected device; determine that a subset of the plurality of stack links are unavailable to transmit communications while at least one of the plurality of stack links is available to transmit communications; and perform, in response to determining that the subset of the plurality of stack links are unavailable to transmit communications while the at least one of the plurality of stack links is available to transmit communications, at least one stack link fault response action that is configured to prevent the connected device from sending at least a portion of the connected device communications to the at least one first connected device port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
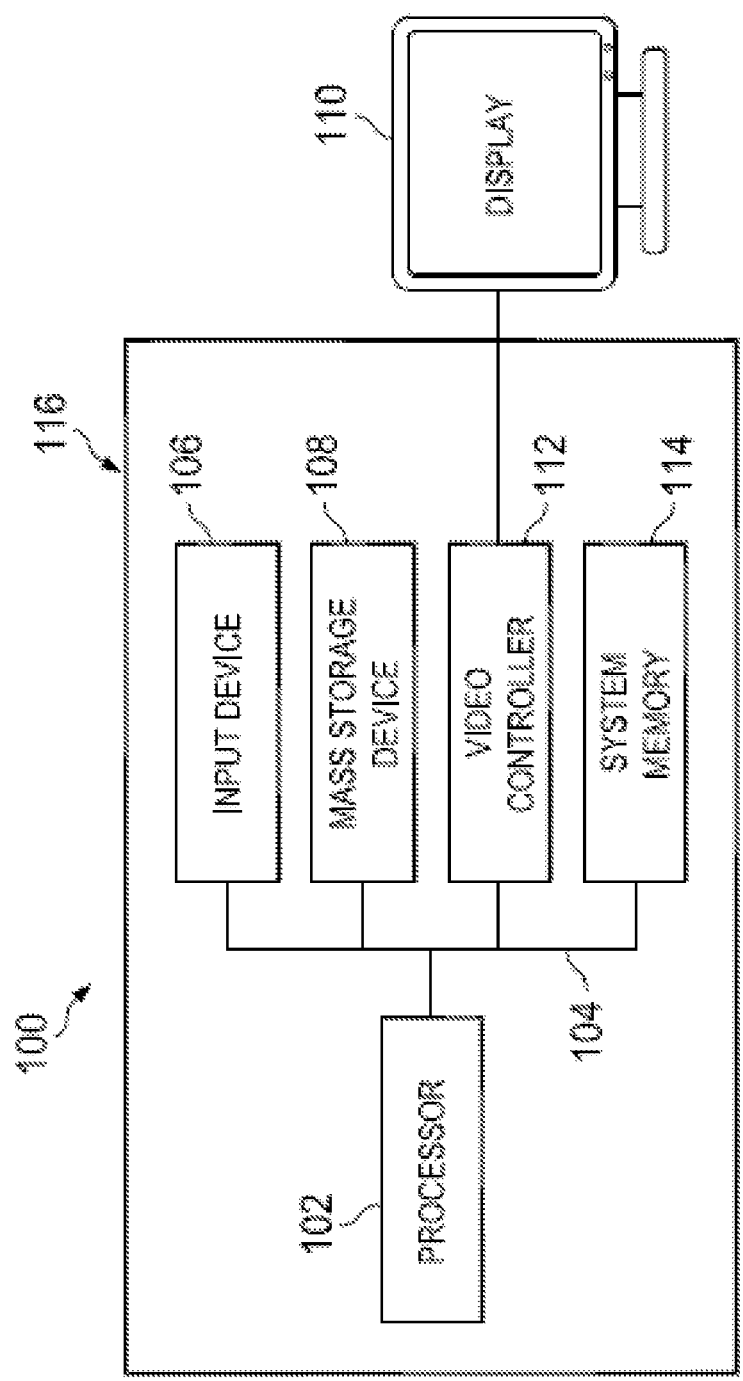
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
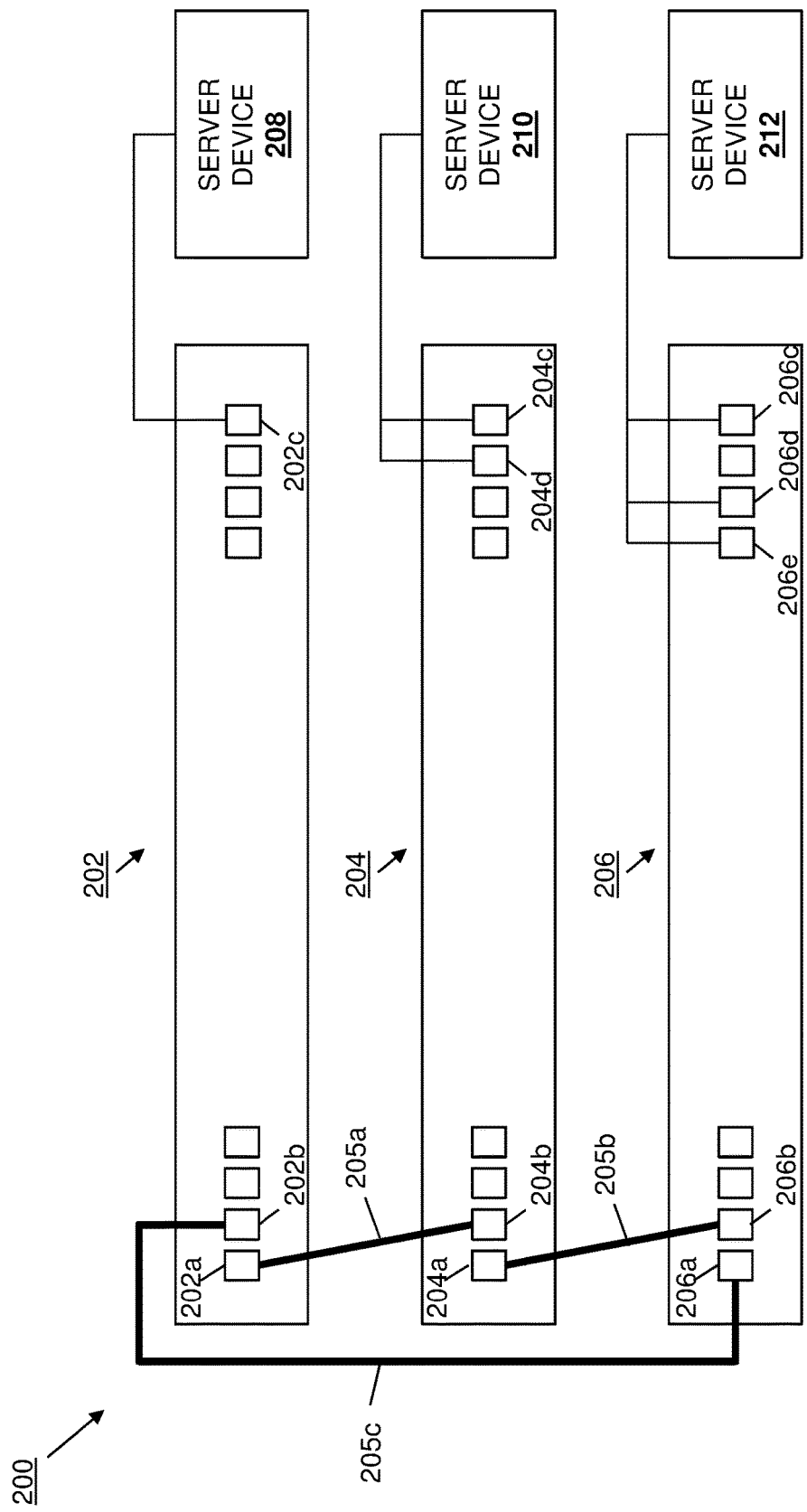
FIG. 2 is a schematic view illustrating an embodiment of a stack link fault response system.

Referring now to FIG. 2, an embodiment of stack link fault response system 200 is illustrated. In the illustrated embodiment, the stack link fault response system 200 includes a plurality of networking devices 202, 204, and 206 that are coupled together to provide a stacked networking device system. Any or all of the networking devices 202-206 may be the IHS 100 discussed above with reference to FIG. 1, and/or may include some or all of the components of the IHS 100. In a specific embodiment, any or all of the networking devices 202-206 may be provided by switch devices, although other networking devices may benefit from the teachings of the present disclosure and thus are envisioned as falling within its scope. While only three networking devices 202-206 are illustrated, one of skill in the art in possession of the present disclosure will recognize that different numbers of networking devices may be provided in the stack link fault response system 200 while remaining within the scope of the present disclosure as well.

Each of the networking devices 202-206 includes a plurality of stack ports such as, for example, the stack ports 202a and 202b on the networking device 202, the stack ports 204a and 204b on the networking device 204, and the stack ports 206a and 206b on the networking device 206. FIG. 2 illustrates a specific example of the coupling of the stack ports on the networking devices 202-206 to provide the stacked networking device system, with the stack port 202a on the networking device 202 connected to the stack port 204b on the networking device 204 via a cable (e.g., an Ethernet cable) to provide a stack link 205a, the stack port 204a on the networking device 204 connected to the stack port 206b on the networking device 206 via a cable (e.g., an Ethernet cable) to provide a stack link 205b, and the stack port 206a on the networking device 206 connected to the stack port 202b on the networking device 202 via a cable (e.g., an Ethernet cable) to provide a stack link 205c. However, while a specific stacking configuration is illustrated, one of skill in the art in possession of the present disclosure will recognize that the stack ports on the networking devices 202-206 may be coupled together in a variety of manners and stacking configurations that will fall within the scope of the present disclosure. For example, in the embodiments discussed below, any pair of networking devices may be coupled together by multiple stack links provided by the connection of multiple stack ports.

Each of the networking devices 202-206 also includes a plurality of device ports such as, for example, the device port 202c on the networking device 202, the device ports 204c and 204d on the networking device 204, and the device ports 206c, 206d, and 206e on the networking device 206. FIG. 2 illustrates a specific example of the coupling of the device ports on the networking devices 202-206 to server devices, with the device port 202c on the networking device 202 connected to a server device 208 via a cable (e.g., an Ethernet cable), the device ports 204c and 204d on the networking device 204 connected to the server device 210 via cable(s) (e.g., Ethernet cable(s)), and the device ports 206c, 206d, and 206e on the networking device 206 connected to the server device 212 via cable(s) (e.g., Ethernet cable(s)). Any or all of the server devices may be the IHS discussed above with reference to FIG. 1, and/or may include some or all of the components of the IHS 100. While each networking device 202-206 is illustrated as coupled to single server device, one of skill in the art in possession of the present disclosure will recognize that networking devices may be coupled to different numbers of server devices while remaining within the scope of the present disclosure. Furthermore, while a specific coupling of the networking devices 202-206 to server devices 208-212 is illustrated, one of skill in the art in possession of the present disclosure will recognize that the networking devices may be coupled to a variety of connected devices in a variety of manners that will fall within the scope of the present disclosure. For example, in the embodiments discussed below, server devices may be coupled to different networking devices that are each part of different stacked networking device systems.

For the purposes of the discussion below, data traffic transmitted between the networking devices 202, 204, and 206 using the stack links 205a, 205b, and/or 205c may be referred to as being transmitted in an "east-west" direction, while data traffic transmitted between any of the server devices 208, 210, and 212 and their respective networking devices 202, 204, and 206 (as well as between any of the networking devices 202, 204, and 206 and a network such as a LAN or the Internet) may be referred to as being transmitted in a "north-south" direction. As would be understood by one of skill in the art in possession of the present disclosure, while the specific embodiment of FIG. 2 utilizes switch devices to receive data traffic transmitted in a north-south direction from server devices, and transmit that data traffic in an east-west direction between the switch devices using stack links 205a-205c, the teachings of the present disclosure will provide benefits to a variety of east-west direction data traffic systems that will fall within the scope of the present disclosure as well.

Figure 3:
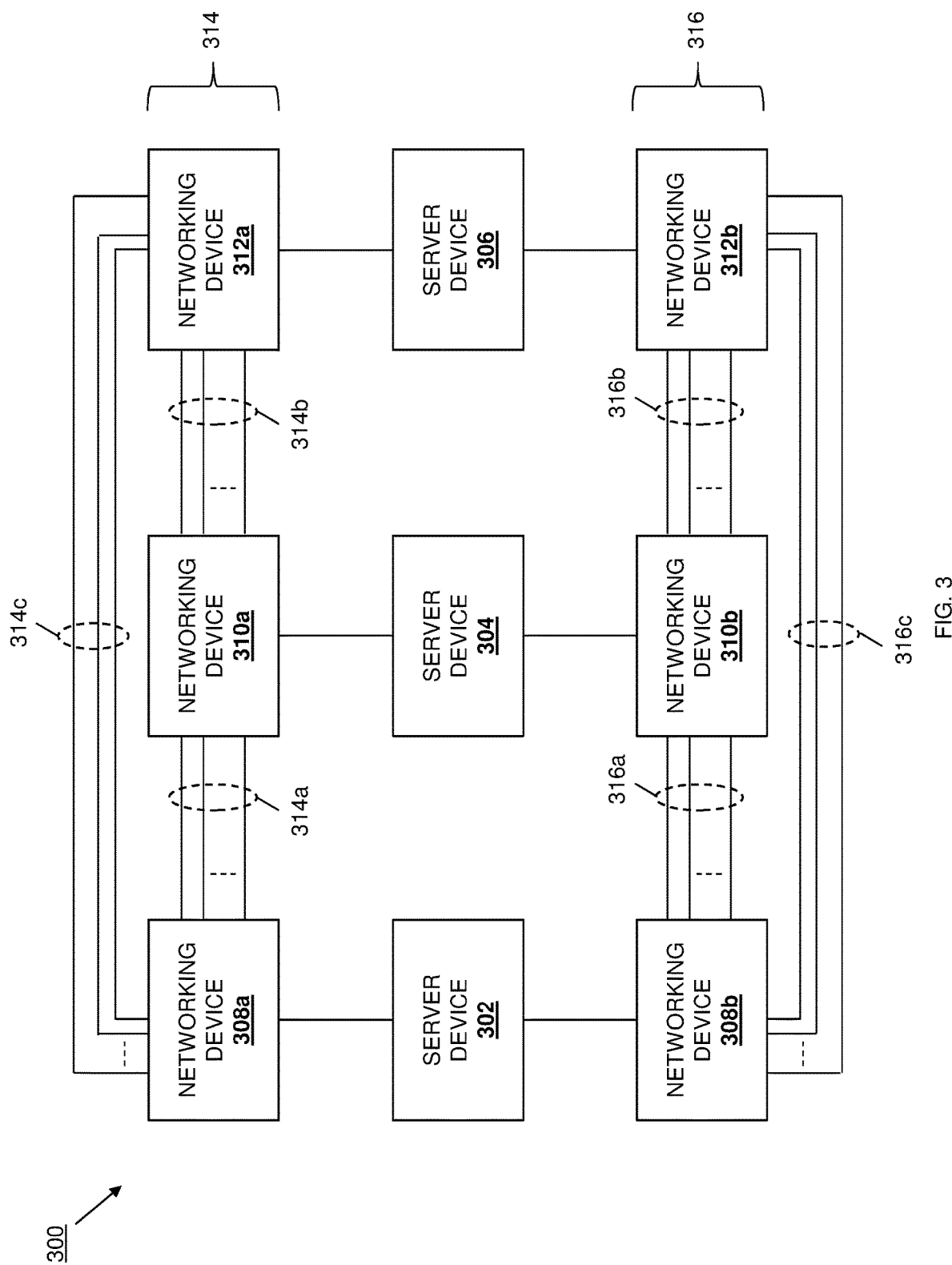
FIG. 3 is a schematic view illustrating an embodiment of a stack link fault response system.

Referring now to FIG. 3, an embodiment of stack link fault response system 300 is illustrated. In the illustrated embodiment, the stack link fault response system 300 includes a plurality of server devices such as the server devices 302, 304, and 306. Any or all of the server devices 302-306 may be the IHS discussed above with reference to FIG. 1, and/or may include some or all of the components of the IHS 100. While only three server devices are illustrated, one of skill in the art in possession of the present disclosure will recognize that different numbers of server devices may be utilized in the stack link fault response system 300 while remaining within the scope of the present disclosure. Each of the server devices 302-306 is coupled to a pair of networking devices, with the server device 302 connected to a networking device 308a and a networking device 308b, the server device 304 connected to a networking device 310a and a networking device 310b, and the server device 306 connected to a networking device 312a and a networking device 312b. Any or all of the networking devices 308a, 308b, 310a, 310b, 312a, and 312b may be the IHS discussed above with reference to FIG. 1 and/or may include some or all of the components of the IHS 100, and in specific examples may be switch devices, although other networking devices may benefit from the teachings the of the present disclosure and thus are envisioned as falling within its scope as well. While each of the server devices 302-306 is illustrated as including a single link to each of its connected networking devices, the link between any server device 302-306 and a networking device may be provided by more than one link (e.g., in a Link Aggregation Group (LAG) or using other link aggregation methods known in the art.)

In the illustrated embodiment, the networking devices 308a, 310a, and 312a are coupled together to provide a stacked networking device system 314 via a plurality of stack links between the networking device 308a and the networking device 310a that are aggregated together (i.e., in a LAG or using other link aggregation methods known in the art) to form an aggregated stacking link 314a (e.g., an Inter-Chassis Link (ICL), an Inter-Switch Link (ISL), and/or other aggregated link known in the art), via a plurality of stack links between the networking device 310a and the networking device 312a that are aggregated together (i.e., in a LAG or using other link aggregation methods known in the art) to form an aggregated stacking link 314b (e.g., an Inter-Chassis Link (ICL), an Inter-Switch Link (ISL), and/or other aggregated link known in the art), and via a plurality of stack links between the networking device 312a and the networking device 308a that are aggregated together (i.e., in a LAG or using other link aggregation methods known in the art) to form an aggregated stacking link 314c (e.g., an Inter-Chassis Link (ICL), an Inter-Switch Link (ISL).

Similarly, the networking devices 308b, 310b, and 312b are coupled together to provide a stacked networking device system 316 via a plurality of stack links between the networking device 308b and the networking device 310b that are aggregated together (i.e., in a LAG or using other link aggregation methods known in the art) to form an aggregated stacking link 316a (e.g., an Inter-Chassis Link (ICL), an Inter-Switch Link (ISL), and/or other aggregated link known in the art), via a plurality of stack links between the networking device 310b and the networking device 312b that are aggregated together (i.e., in a LAG or using other link aggregation methods known in the art) to form an aggregated stacking link 316b (e.g., an Inter-Chassis Link (ICL), an Inter-Switch Link (ISL), and/or other aggregated link known in the art), and via a plurality of stack links between the networking device 312b and the networking device 308b that are aggregated together (i.e., in a LAG or using other link aggregation methods known in the art) to form an aggregated stacking link 316c (e.g., an Inter-Chassis Link (ICL), an Inter-Switch Link (ISL). However, while specific examples of the couplings between the networking devices that provides their associated stacked networking device systems have been illustrated and described, one of skill in the art will recognize that different couplings (e.g., a single stack link between networking devices) may be used to provide at least a portion of the stacked networking device system(s) while remaining within the scope of the present disclosure.

For the purposes of the discussion below, data traffic transmitted between the networking devices 308a, 310a, and 312a using the aggregated stacking links 314a, 314b, and/or 314c, as well as data traffic transmitted between the networking devices 308b, 310b, and 312b using the aggregated stacking links 316a, 316b, and/or 316c, may be referred to as being transmitted in an "east-west" direction, while data traffic transmitted between any of the server devices 302, 304, and 306 and their respective networking devices 308a/308b, 310a/310b, and 312a/312b (as well as between any of the networking devices 308a, 308b, 310a, 310b, 312a, and 312b and a network such as a LAN or the Internet) may be referred to as being transmitted in a "north-south" direction. As would be understood by one of skill in the art in possession of the present disclosure, while the specific embodiment of FIG. 3 utilizes switch devices to receive data traffic transmitted in a north-south direction from server devices and transmit it in an east-west direction between the switch devices using aggregated stacking links 314a, 314b, 314c, 316a, 316b, and/or 316c, the teachings of the present disclosure will provide benefits to a variety of east-west direction data traffic systems that will fall within the scope of the present disclosure as well.

Figure 4:
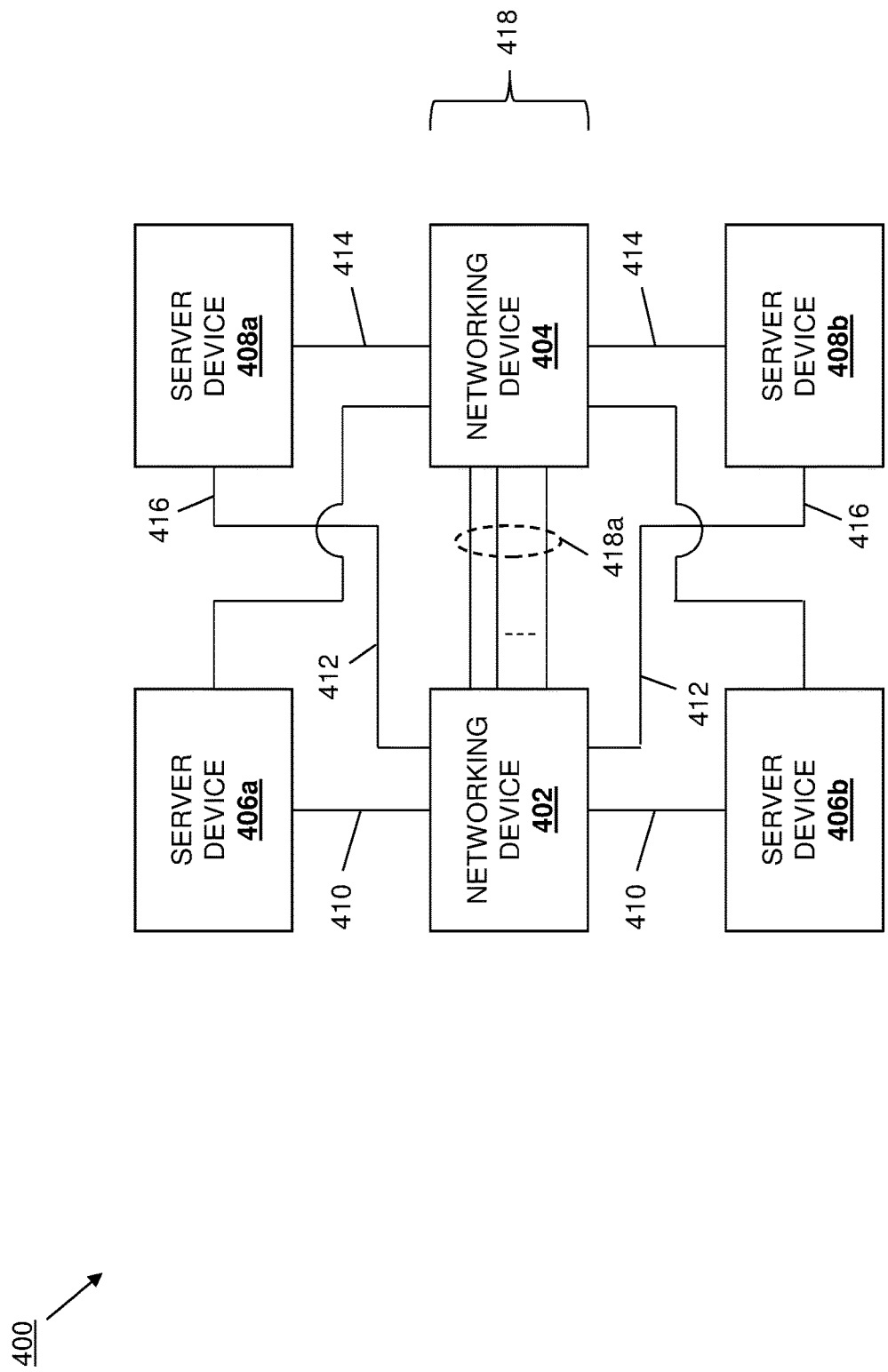
FIG. 4 is a schematic view illustrating an embodiment of a stack link fault response system.

Referring now to FIG. 4, an embodiment of stack link fault response system 400 is illustrated. In the illustrated embodiment, the stack link fault response system 400 includes a plurality of networking devices such as the networking devices 402 and 404. Either or both of the networking devices 402 and 402 may be the IHS discussed above with reference to FIG. 1 and/or may include some or all of the components of the IHS 100, and in specific examples may be switch devices (although other networking devices may benefit from the teachings of the present disclosure and thus will fall within its scope as well.) While only two networking devices are illustrated, one of skill in the art in possession of the present disclosure will recognize that different numbers of networking devices may be utilized in the stack link fault response system 400 while remaining within the scope of the present disclosure.

Each of the networking devices 402 and 404 are coupled to a plurality of server devices, any or all of the which may be the IHS discussed above with reference to FIG. 1 and/or may include some or all of the components of the IHS 100, and in other embodiments may be a variety of other connected devices that will fall within its scope of the present disclosure as well. In the illustrated embodiment, the networking device 402 is connected to a server device 406a and a server device 406b by respective primary links 410, and to a server device 408a and a server device 408b by respective secondary links 412. Similarly, the networking device 404 is connected to the server device 408a and the server device 408b by respective primary links 414, and to the server device 406a and the server device 406b by respective secondary links 416. While each of the networking devices 402 and 404 is illustrated as including a single link to each of its connected server devices, the link between either of the networking devices 402 and 404 and the server devices may be provided by more than one link (e.g., in a Link Aggregation Group (LAG) or using other link aggregation methods known in the art.)

As discussed below, in some embodiments, the networking device 402 may utilize its primary links 410 to the server devices 406a and 406b to transmit a first type of data and reserve its secondary links 412 to the server devices 408a and 408b as a standby/backup for transmitting a second type of data (i.e., when the networking device 404 is unable to do so), while the networking device 404 may utilize its primary links 414 to the server devices 408a and 408b to transmit the second type of data and reserve its secondary links 416 to the server devices 406a and 406b as a standby/backup for transmitting the first type of data (i.e., when the networking device 402 is unable to do so.) However, one of skill in the art in possession of the present disclosure will recognize that the networking devices 402 and 404 may be utilized in a variety of other scenarios and to transmit a variety of other data while remaining within the scope of the present disclosure as well.

In the illustrated embodiment, the networking devices 402 and 404 are coupled together to provide at least part of a stacked networking device system 418 via a plurality of stack links between the networking device 402 and the networking device 404 that are aggregated together (i.e., in a LAG or using other link aggregation methods known in the art) to form an aggregated stacking link 418a (e.g., an Inter-Chassis Link (ICL), an Inter-Switch Link (ISL), and/or other aggregated link known in the art). However, while a specific example of the coupling between the networking devices that provides their associated stacked networking device system has been illustrated and described, one of skill in the art will recognize that different couplings (e.g., a single stack link between networking devices) may be used to provide at least a portion of the stacked networking device system(s) while remaining within the scope of the present disclosure.

For the purposes of the discussion below, data traffic transmitted between the networking devices 402 and 404 using the aggregated stacking link 418a may be referred to as being transmitted in an "east-west" direction, while data traffic transmitted between any of the server devices 406a, 406b, 408a, 408b, and either of the networking devices 402 and 404 (as well as between either of the networking devices 402 and 404 and a network such as a LAN or the Internet) may be referred to as being transmitted in a "north-south" direction. As would be understood by one of skill in the art in possession of the present disclosure, while the specific embodiment of FIG. 4 utilizes switch devices to receive data traffic transmitted in a north-south direction from server devices and transmit it in an east-west direction between the switch devices using aggregated stacking link 418a, the teachings of the present disclosure will provide benefits to a variety of east-west direction data traffic systems that will fall within the scope of the present disclosure as well.

While a variety of different stack link fault response systems have been illustrated and described, one of skill in the art in possession of the present disclosure will recognize that those examples should not be interpreted as limiting, and a wide variety of modification to those examples will fall within the scope of the present disclosure as well. For example, features, components, configurations, and/or functionality in any of the examples of the stack link fault response systems 200, 300, and/or 400 may be combined with features, components, configurations, and/or functionality of the others of the stack link fault response systems 200, 300, and 400 while remaining within the scope of the present disclosure.

Figure 5:
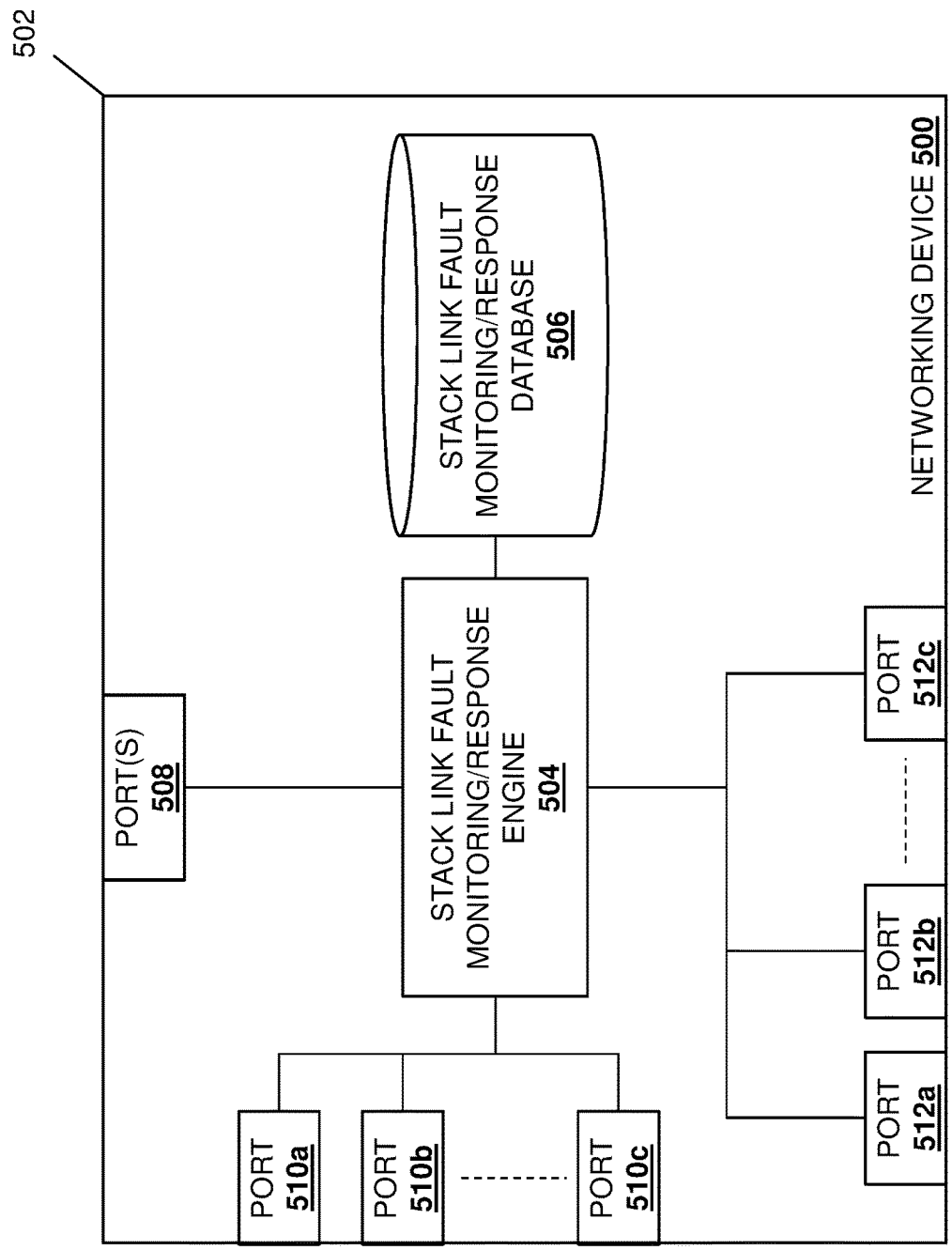
FIG. 5 is a schematic view illustrating an embodiment of a networking device used in the stack link fault response systems of FIGS. 3, 4, and 5.

Referring now to FIG. 5, an embodiment of a networking device 500 is illustrated that may be any of the networking devices provided in the stack link fault response systems 200, 300, and/or 400 discussed above. As such, the networking device 500 may be the IHS 100 discussed above with reference to FIG. 1 and/or may include some or all of the components of the IHS 100, and in specific examples may be a switch device (although other networking devices may benefit from the teachings of the present disclosure as thus are envisioned as falling within its scope.) In the illustrated embodiment, the networking device 500 includes a chassis 502 that houses the components of the networking device 500, only some of which are illustrated in FIG. 5. For example, the chassis 502 may house a processing system (not illustrated, but which may include the processor 102 discussed above with reference to FIG. 1), and a memory system (not illustrated, but which may include the system memory discussed above with reference to FIG. 1) that is coupled to the processing system and that includes instructions that, when executed by the processing system, cause the processing system to provide a stack link fault monitoring/response engine 504 that is configured to perform the functions of the stack link fault monitoring/response engines and/or networking devices discussed below.

The chassis 502 may also house a storage system (not illustrated, but which may include the storage device 108 discussed above with reference to FIG. 1) that is coupled to the stack link fault monitoring/response engine 504 (e.g., via a coupling between the storage system and the processing system) and that includes a stack link fault monitoring/response database 506 that is configured to store any of the information that is utilized to provide the functionality discussed below. For example, some of the embodiments discussed below provide the stack link fault monitoring/response database 506 that may provide, for each of a plurality of degraded and/or unavailable stack link or aggregated stacking link states, one or more stack link fault response actions to perform, one or more priority assignments for connected device ports (discussed below), and/or any other stack link fault response information that would be apparent to one of skill in the art in possession of the present disclosure. The chassis 502 may also include a communication system that is coupled to the stack link fault monitoring/response engine 504 (e.g., via a coupling between the communication system and the processing system) and that includes at least one port 508 that is configured to couple to a network (e.g., a Local Area Network (LAN), the Internet, etc.), a plurality of stack ports 510a, 510b, and up to 510c that are configured to couple to other networking devices, and a plurality of connected device ports 512a, 512b, and up to 512c that are configured to couple to connected devices such as the server devices discussed below. While a specific networking device 500 has been described, one of skill in the art in possession of the present disclosure will recognize that networking devices may include a variety of components other than those illustrated in order to provide a variety of conventional networking device functionality, as well as the functionality discussed below, while remaining within the scope of the present disclosure.

Figure 6:
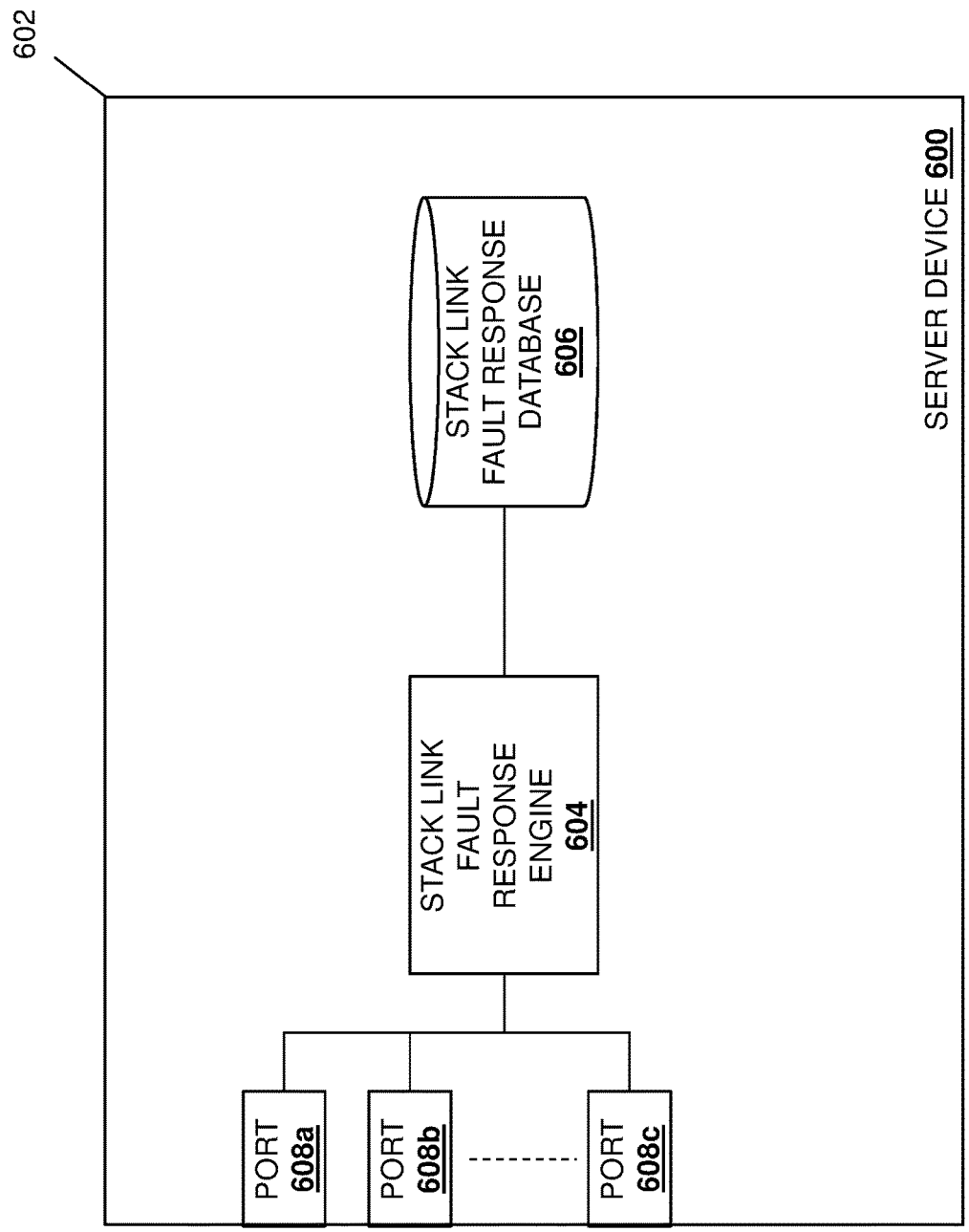
FIG. 6 is a schematic view illustrating an embodiment of a server device used in the stack link fault response systems of FIGS. 3, 4, and 5.

Referring now to FIG. 6, an embodiment of a server device 600 is illustrated that may be any of the server devices provided in the stack link fault response systems 200, 300, and/or 400 discussed above. As such, the server device 600 may be the IHS 100 discussed above with reference to FIG. 1 and/or may include some or all of the components of the IHS 100, and in some embodiments may be replaced by a variety of other connected devices known in the art. In the illustrated embodiment, the server device 600 includes a chassis 602 that houses the components of the server device 600, only some of which are illustrated in FIG. 6. For example, the chassis 602 may house a processing system (not illustrated, but which may include the processor 102 discussed above with reference to FIG. 1), and a memory system (not illustrated, but which may include the system memory discussed above with reference to FIG. 1) that is coupled to the processing system and that includes instructions that, when executed by the processing system, cause the processing system to provide a stack link fault response engine 604 that is configured to perform the functions of the stack link fault response engines and/or server devices discussed below.

The chassis 602 may also house a storage system (not illustrated, but which may include the storage device 108 discussed above with reference to FIG. 1) that is coupled to the stack link fault response engine 604 (e.g., via a coupling between the storage system and the processing system) and that includes a stack link fault response database 606 that is configured to store any of the information that is utilized to provide the functionality discussed below. For example, some of the embodiments discussed below provide the stack link fault response database 606 that may provide, for each of a plurality of degraded stack link or aggregated stacking link conditions, one or more stack link fault response actions to perform. The chassis 602 may also include a communication system that is coupled to the stack link fault response engine 504 (e.g., via a coupling between the communication system and the processing system) and that includes a plurality of networking device ports 608*a*, 608*b*, and up to 608*c* that are configured to couple to networking devices. While a specific server device 600 has been described, one of skill in the art in possession of the present disclosure will recognize that server devices may include a variety of components other than those illustrated in order to provide a variety of conventional server device functionality, as well as the functionality discussed below, while remaining within the scope of the present disclosure.

Figure 7:
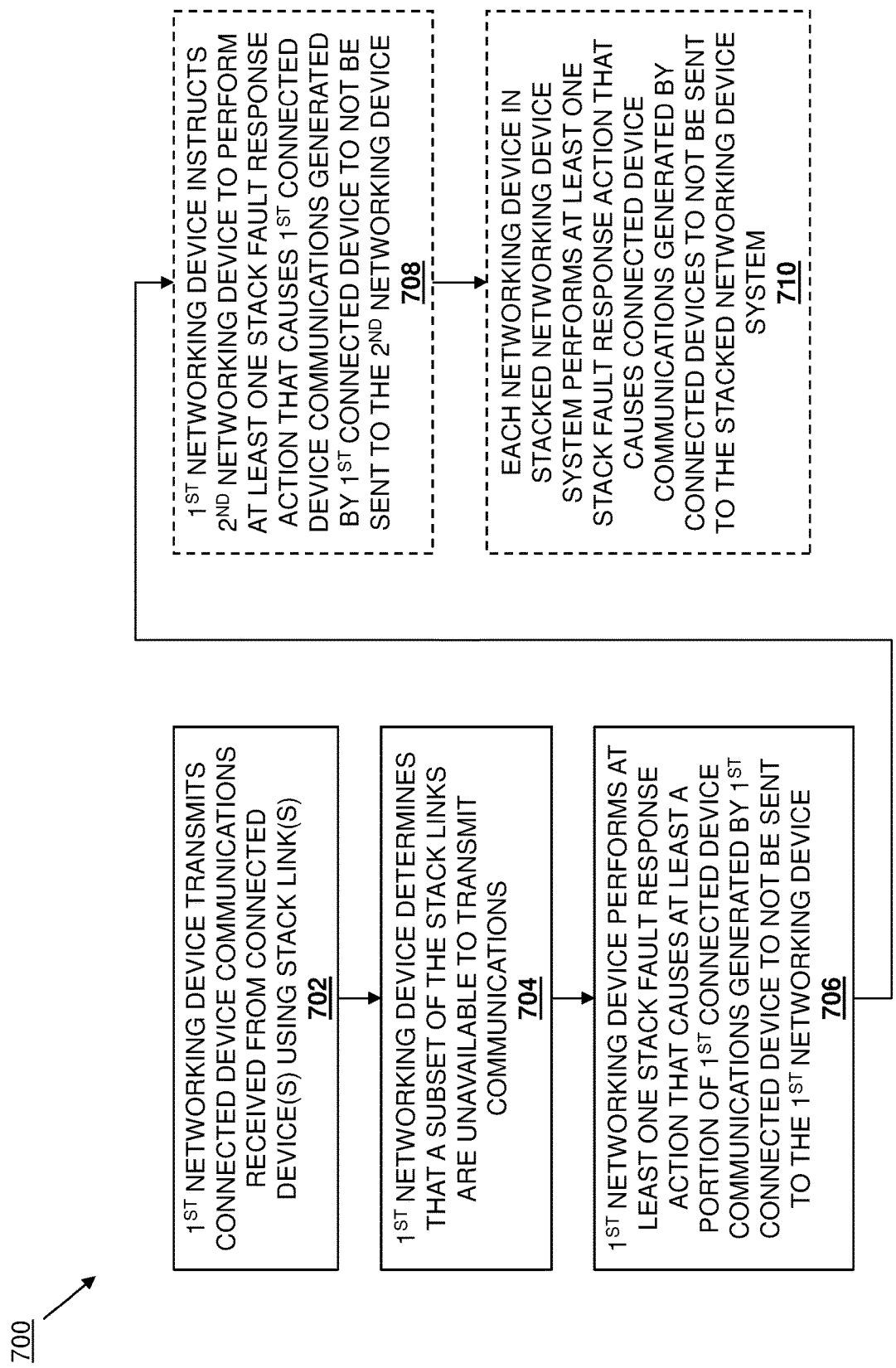
FIG. 7 is a flow chart illustrating an embodiment of a method for responding to stack link faults.

Referring now to FIG. 7, an embodiment of a method 700 for responding to stack link faults is illustrated. As discussed below, some embodiments of the systems and methods provide for the dynamic monitoring of an aggregated stacking link (e.g., Inter-Switch Links (ISLs) including multiple stack links between switch devices) to determine whether that aggregated stacking link is fully operational, partially operational, or not operational. This allows the classification of the aggregated stacking link in various intermediate degraded states (i.e., rather than simply "up" or "down" as in conventional stacked networking device systems), and allows stack link fault response actions to be performed to prevent or limit the dropping of communications received from connected devices. For example, networking devices in the systems and methods of the present disclosure may have their ports that are connected to different connected devices assigned with different priorities, and may then perform stack link fault response actions that shut down ports connected to relatively lower priority connected devices when the aggregated stacking link is degraded, which may cause those connected devices to reroute their communications such that they are no longer sent to the networking device(s) utilizing the degraded aggregated stacking link. In another example, networking devices in the systems and methods of the present disclosure may perform stack link fault response actions that inform connected devices when an aggregated stacking link is degraded, and those connected devices may then operate to reroute their communications in a similar manner but without the need to shut down the port(s) on the networking device that are connected to those connected devices. In yet another embodiment, networking devices in the systems and methods of the present disclosure may perform stack link fault response actions that inform connected devices when the aggregated stacking link is degraded, and those connected devices may then limit their advertisements of their available services, which may operate to reduce the amount of traffic sent to the networking device(s) utilizing the degraded aggregated stacking link. Furthermore, multiple networking devices may cooperate to perform stack link fault response actions that reduce the amount of traffic sent to the networking device(s) utilizing the degraded aggregated stacking link. As such, the operation of the stacked networking device systems of the present disclosure is improved over conventional stacked networking device system due to the ability to adjust communications for degraded, but at least partially operational, aggregated stacking links between networking devices.

The method 700 begins at block 702 where a first networking device uses stack link(s) to transmit connected device communications received from connected device(s). In an embodiment, at block 702, any or all of the networking devices in the stack link fault response systems 200, 300, and/or 400 may operate to receive north-south direction connected device communications from their connected devices, and transmit those connected device communications in an east-west direction between each other. With reference to the stack link fault response system 200 of FIG. 2, at block 702 any of the networking devices 202-206 may operate to receive north-south server device communications from any of the server devices 208-212, and transmit those server device communications in an east-west direction between each other. For example, the networking device 202 may receive north-south direction server device communications from the server device 208, and transmit those server device communications over the stack link 205*a* to the networking device 204 and/or over the stack link 205*c* to the networking device 206. With reference to the stack link fault response system 300 of FIG. 3, at block 702 any of the networking devices 308*a*/310*a*/312*a* and/or 308*b*/310*b*/312*b* may receive north-south direction server device communications from any of the server devices 302-306, and transmit those server device communications in an east-west direction between each other. For example, the networking device 308*a* may receive north-south direction server device communications from the server device 302, and transmit those server device communications in an east-west direction over the aggregated stacking link 314*a* to the networking device 310*a* and/or over the aggregated stacking link 314*c* to the networking device 312*a*. With reference to the stack link fault response system 400 of FIG. 4, at block 702 either of the networking devices 402 and 404 may operate to receive north-south direction server device communications from any of the server devices 406*a*, 406*b*, 408*a*, and/or 408*b*, and transmit those server device communications in an east-west direction between each other. For example, the networking device 402 may receive north-south direction server device communications from the server device 406*a*, and transmit those server device communications in an east-west direction over the aggregated stacking link 418a to the networking device 404.

With reference to the networking device 500 of FIG. 5, at block 702 connected device communications may be received by the stack link fault monitoring/response engine 504 through one the connected device port(s) 512a-c, and the stack link fault monitoring/response engine 504 may perform conventional networking device functionality (e.g., conventional switch device functionality) to route those connected device communications through one or more of the stack ports 510a-c and over the stack links to another networking device so that those connected device communications are forwarded towards their destination. While not described herein in detail, one of skill in the art in possession of the present disclosure will recognize that the networking devices of the present disclosure may also route connected device communications (received from a directly connected device through the connected device port(s), or received from a directly connected networking device through the stack port(s) 510a-c), to the network (e.g., a LAN, the Internet, etc.) in order to forward those connected device communications towards their destination while remaining within the scope of the present disclosure as well. While a few examples of the transmission of connected device communications using stack link(s) have been provided, one of skill in the art in possession of the present disclosure will recognize that any of the networking devices described herein may transmit any of a variety of communications over stack link(s) while remaining within the scope of the present disclosure.

The method 700 then proceeds to block 704 where the first networking device determines that a subset of the stack links are unavailable to transmit communications. In an embodiment, at block 704, the stack link fault monitoring/response engine 504 may monitor the stack ports 510a-c to determine whether any stack links provided via those stack ports 510a-c have become unavailable to transmit communications. For example, at block 704, the stack link monitoring/response engine 504 may operate to monitor the stack ports 510a-510b and determine that a stack link provided via the stack port 510a is unavailable to transmit communications based on a physical link or stack link protocol status, and/or utilizing a variety of link availability monitoring techniques known in the art. In embodiments where a plurality of the stack ports 510a-510c are utilized to provide an aggregated stacking link, at block 704 the stack link fault monitoring/response engine 504 may determine a degraded state of the aggregated stacking link based on, for example, the relative number of stack links that are available as compared to the relative number of stack links that are unavailable, the bandwidth of the aggregated stacking link with at least one unavailable stack link as compared to a bandwidth of the aggregated stacking link when all of its stack links are available, and/or utilizing a variety of other aggregated stacking link characteristics that would be apparent to one of skill in the art in possession of the present disclosure. As such, as block 704, an aggregated stacking link connected to a networking device may be determined to be in any of a plurality of intermediate degraded states between a fully available state (i.e., when each of its stack links are available) and an unavailable state (i.e., when each of its stack links are unavailable.) However, as discussed below, in some embodiments individual stack links may enter degraded performance states between fully available and fully unavailable, and the determination of intermediate degraded performance states for individual stack links at block 704 will fall within the scope of the present disclosure as well.

Figure 8:
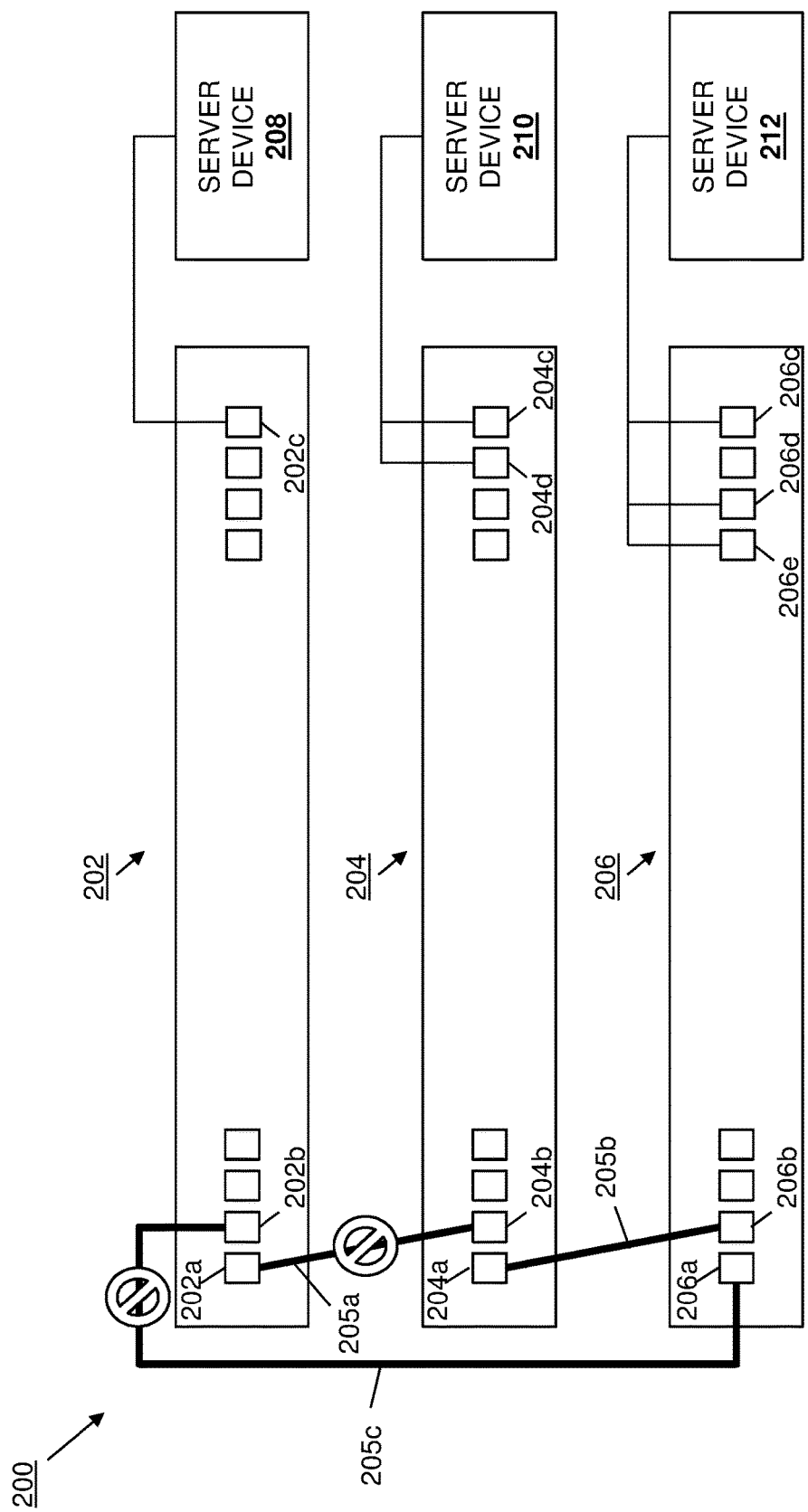
FIG. 8 is a schematic view of the stack link fault response system of FIG. 2 experiencing a stack link fault.

FIG. 8 illustrates a specific example of block 704 in which the stack link 205a provided between the stack port 202a on the networking device 202 and the stack port 204b on the networking device 204 is degraded and/or unavailable to transmit communications, and the stack link 205c provided between the stack port 202b on the networking device 202 and the stack port 206a on the networking device 206 is degraded and/or unavailable to transmit communications. Thus, at block 704, the stack link fault monitoring/response engine 504 in any or all of the networking devices 202, 204, and 206 may detect the degraded and/or unavailable states of the stack links 205a and 205c.

Figure 9:
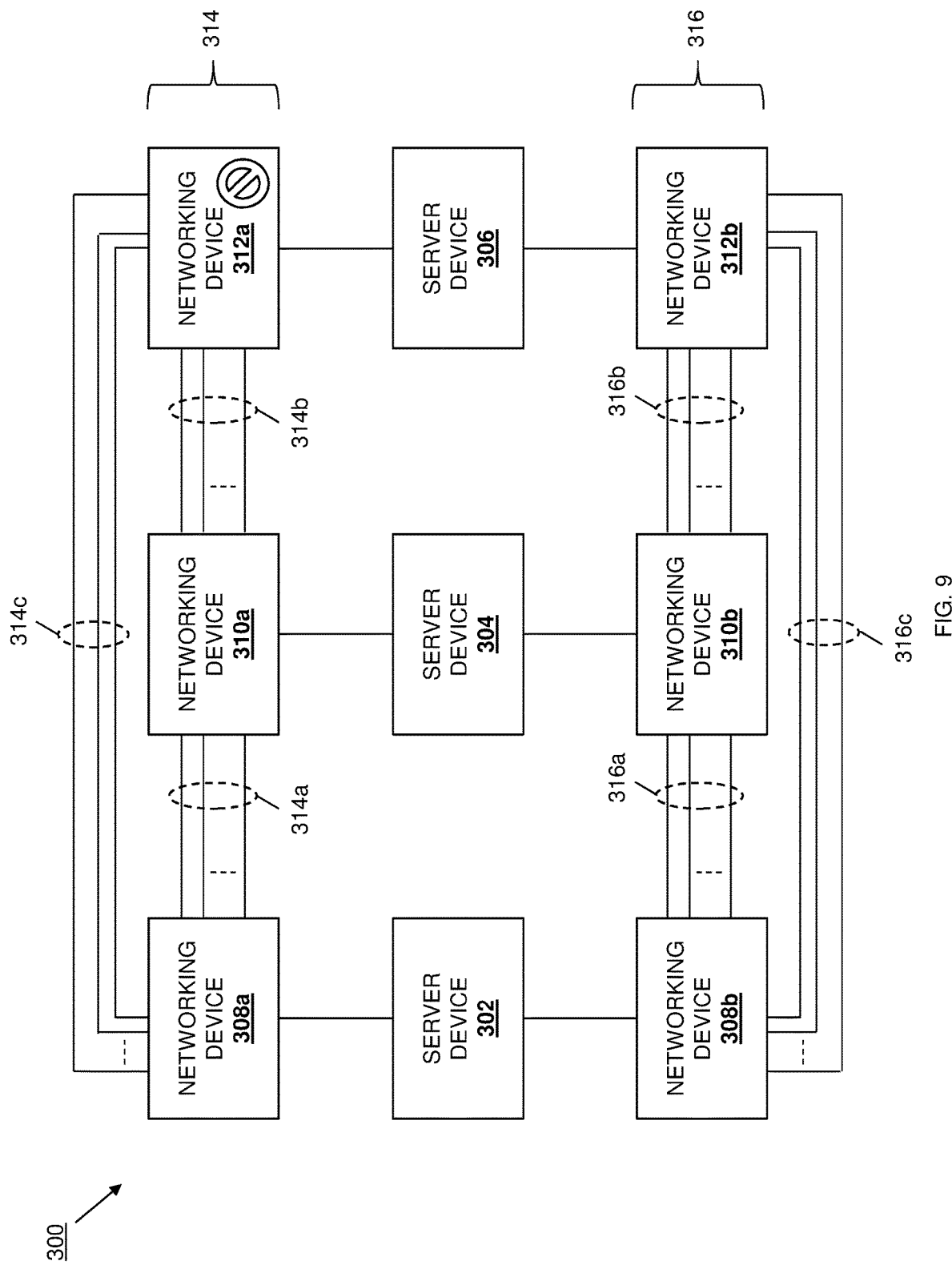
FIG. 9 is a schematic view of the stack link fault response system of FIG. 3 experiencing a stack link fault.

FIG. 9 illustrates a specific example of block 704 in which the networking device 312a has become unavailable such that the aggregated stacking link 314c provided between the networking device 308a and the networking device 312a is degraded and/or unavailable to transmit communications (i.e. through the networking device 312a), and the aggregated stacking link 314b provided between the networking device 310a and the networking device 312a is degraded and/or unavailable to transmit communications (i.e., through the networking device 312a). Thus, at block 704, the stack link fault monitoring/response engine 504 in either of the networking devices 308a and 310a may detect the degraded and/or unavailable states of the aggregated stacking links 314b and 314c.

Figure 10A:
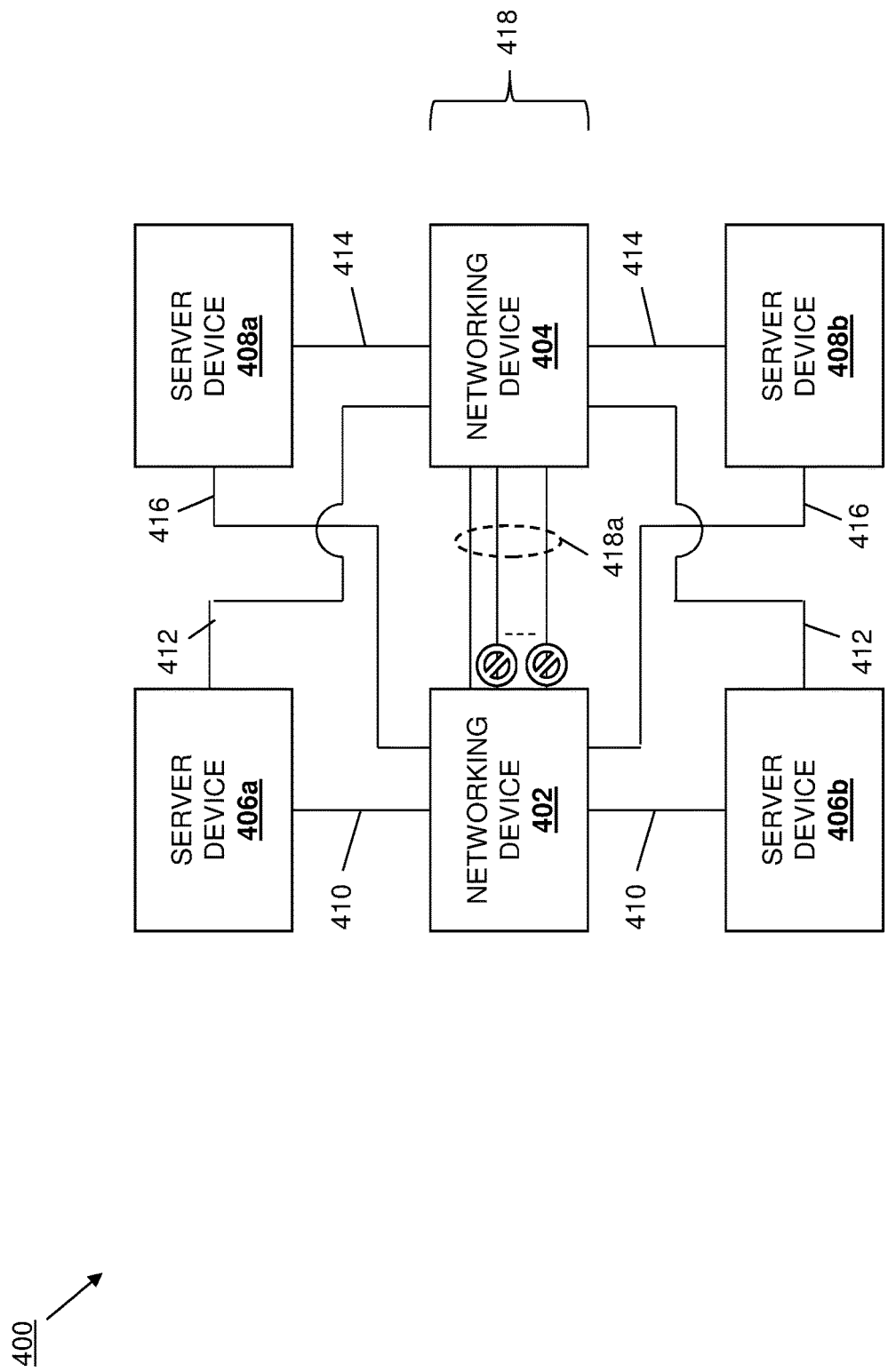
FIG. 10A is a schematic view of the stack link fault response system of FIG. 4 experiencing a stack link fault.
Figure 11A:
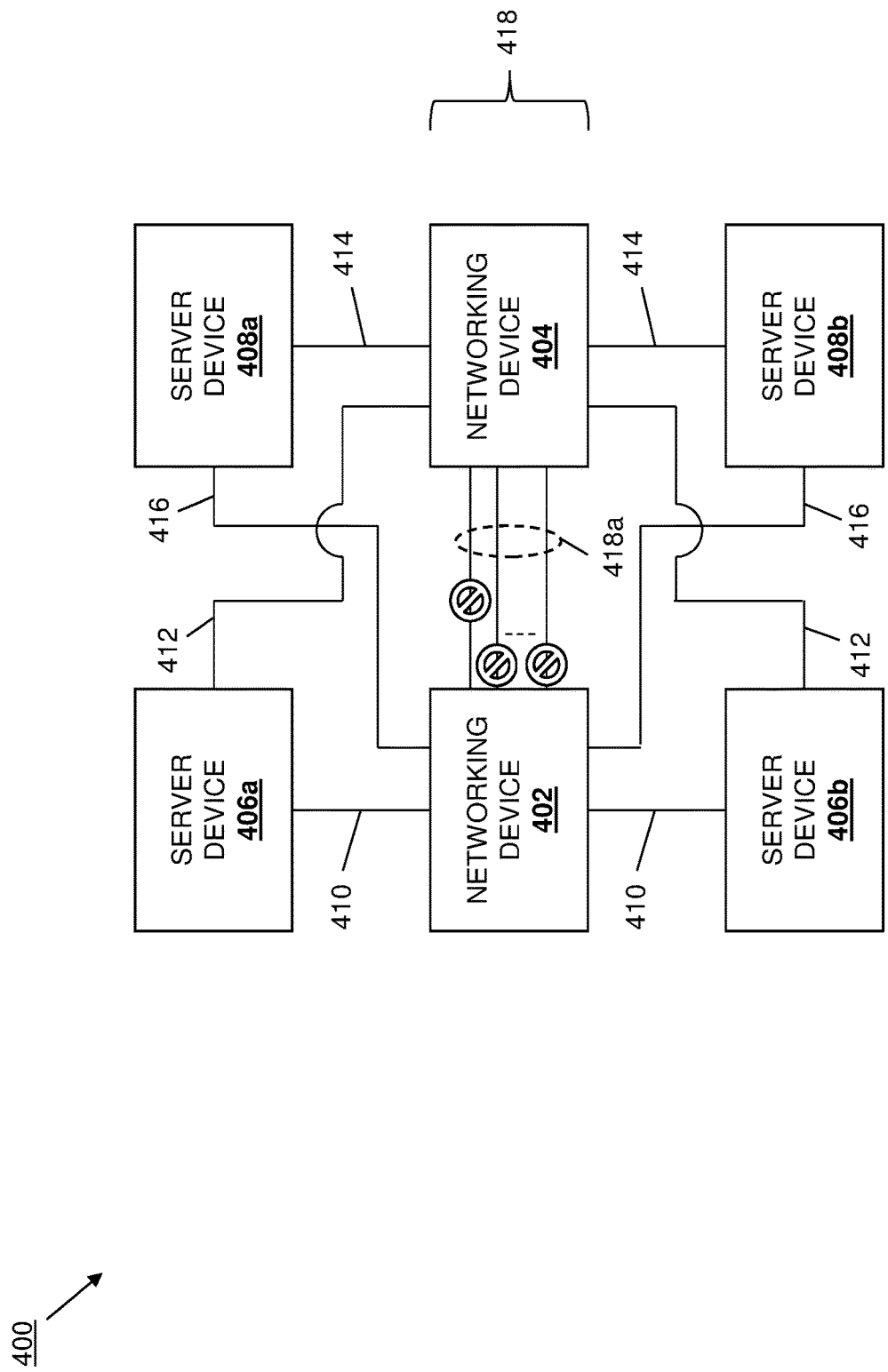
FIG. 11A is a schematic view of the stack link fault response system of FIG. 4 experiencing a stack link fault.

FIG. 10A illustrates a specific example of block 704 in which a subset of the stack links in the aggregated stacking link 418a provided between the networking device 402 and the networking device 404 are degraded and/or unavailable to transmit communications. Thus, at block 704, the stack link fault monitoring/response engine 504 in either of the networking devices 402 and 404 may detect the degraded and/or unavailable states of the aggregated stacking link 418a. FIG. 11A illustrates a specific example of block 704 in which all of the stack links in the aggregated stacking link 418a provided between the networking device 402 and the networking device 418 are degraded and/or unavailable to transmit communications. Thus, at block 704, the stack link fault monitoring/response engine 504 in either of the networking devices 402 and 404 may detect the degraded and/or unavailable states of the aggregated stacking link 418a.

While several specific examples have been provided, one of skill in the art in possession of the present disclosure will recognize that any of the networking devices of the present disclosure may detect that stack links and/or aggregated stacking links are degraded and/or unavailable to transmit communications, that multiple networking devices may determine that the same stack link or aggregated stacking link is degraded and/or unavailable to transmit communications, and/or that stack link or aggregated stacking link degradation and/or unavailability may be determined in a variety of manners while remaining within the scope of the present disclosure. As such, in some embodiments stack link(s) and/or aggregated stacking link(s) may experience reduced performance (e.g., reduced available bandwidth, connectivity, and/or other link characteristics that effect the transmission of communications) without becoming totally unavailable to transmit communications, and that reduced performance may be detected by the stack link fault monitoring/response engine 504 at block 704.

The method 700 then proceeds to block 706 where the first networking device performs at least one stack link fault response action that causes at least a portion of first connected device communications generated by the first connected device to not be sent to the first networking device. In different embodiments, the stack link fault response action(s) performed at block 706 may include a variety of actions performed by the networking device that detected the unavailable stack link, and may in some cases result in actions being performed by other networking devices and/or connected devices that are connected to that networking device as well. The discussion below provides a number of examples of stack link fault response actions, but one of skill in the art in possession of the present disclosure will recognize that any of a variety of actions may be performed to compensate for the degraded performance of an aggregated stacking link (that is due to the unavailability or degradation of one or more of its component stack links) while remaining within the scope of the present disclosure.

Referring first to FIG. 8, in an embodiment of block 706 and in response to determining that the stack link 205a and the stack link 205c are degraded and/or unavailable to transmit communications, the stack link fault monitoring/response engine 504 in the networking device 202 may operate to shut down the connected device port 202c that provides the link to the server device 208, which operates to prevent the server device 208 from sending communications through that link via the connected device port 202c and to the networking device 202 (i.e., where those communications would otherwise be dropped due to the degraded and/or unavailable stack links 205a and 205c.) For example, at block 706 the stack link fault monitoring/response engine 504 in the networking device 202 may access the stack link fault monitoring/response database 506 and determine, using the degraded/unavailable state of the stack links 205a and 205c, that the stack link fault response action associated with that degraded/unavailable state is to shut down the connected device port 202c.

As discussed below, in some embodiments the server device 208 may be connected to a different networking device (not illustrated), and in response to the shut down of the connected device port 202c at block 706, the server device 208 may operate to reroute its communications (which were being sent through the link provided by the connected device port 202c) so that they are subsequently sent to that different networking device. As such, stack link fault response actions may include shutting down ports to connected devices so that those connected devices then select alternate paths for their communications through other networking devices in order direct communications away from the degraded/unavailable stack link.

In some embodiments, the networking device 202 may include connected device priority assignments (i.e., stored in the stack link fault monitoring/response database 506) for any or all of its connected devices, and at block 706 the stack link fault monitoring/response engine 504 may operate to determine the relative priorities of connected devices that are connected to each of its connected device ports 512a-c, which enables the stack link fault monitoring/response engine 504 to shut down subsets of its connected device ports 512a-c that are connected to relatively lower priority connected devices. For example, the stack link fault monitoring/response engine 504 may determine an available bandwidth of a degraded or unavailable stack link, and then use that available bandwidth to determine a subset of its connected device ports 512a-c (i.e., that are connected to relatively low priority connected devices) that must be shut down in order to ensure sufficient bandwidth over the degraded or unavailable stack link for continued communications by relatively high priority connected devices.

In some embodiments, at block 706 and in response to the degradation or unavailability of the stack link(s), the stack link fault monitoring/response engine 504 may send stack link fault message(s) to its connected device. For example, at block 706 the stack link fault monitoring/response engine 504 in the networking device 202 may access the stack link fault monitoring/response database 506 and determine, using the degraded/unavailable state of the stack links 205a and 205c, that the stack link fault response action associated with that degraded/unavailable state is to send the sever device 208 a stack link fault message that causes the server device 208 to reroute its communications (i.e., to another networking device to which it is connected (not illustrated)) such that those communications are no longer sent through the link provided by the connected device port 202c. As such, rather than shutting down connected device ports, networking devices may inform connected devices of degraded or unavailable stack link(s), and the stack link fault response engine 604 in those server devices 600 may utilize rerouting information stored in its stack link fault response database 606 to reroute its communications to avoid the degraded or unavailable stack link(s). In specific examples, the server device 600 may identify the unavailable or degraded state of a stack link in the stack link fault message, and then access its stack link fault response database 606 to determine a stack link fault response action to perform based on that unavailable or degraded state. As such, server devices 600 may utilized a degraded state of a stack link (e.g., a reduced bandwidth) to perform a variety of actions such as, for example, rerouting lower priority communications away from the networking device that utilizes that degraded stack link, while continuing to send higher priority communications to the networking devices that utilizes that degraded stack link.

In yet another example, at block 706 the stack link fault monitoring/response engine 504 in the networking device 202 may access the stack link fault monitoring/response database 506 and determine, using the degraded/unavailable state of the stack links 205a and 205c, that the stack link fault response action associated with that degraded/unavailable state is to send the sever device 208 a stack link fault message that causes the server device 208 to limit its advertisement of available services (i.e., to devices and/or subsystems connected to the server device 208) in order to generate fewer communications that are subsequent sent through the link provided by the connected device port 202c. In specific examples, the server device 600 may identify the unavailable or degraded state of a stack link in the stack link fault message, and then access its stack link fault response database 606 to determine a stack link fault response action that included limiting its advertised services. The advertisement limiting functionality of the server devices in response to the stack link fault messages may be performed by itself, in addition to the rerouting of communications by the server device, and/or in a variety of other manners that will fall within the scope of the present disclosure. In yet another example, at block 706 the stack link fault monitoring/response engine 504 in the networking device 202 may access the stack link fault monitoring/response database 506 and determine, using the degraded/unavailable state of the stack links 205a and 205c, that the stack link fault response action associated with that degraded/unavailable state is to determine an available (reduced) bandwidth for the networking device 202 using the degraded/unavailable stack links 205a and 205c, and then run a script or change a Quality of Service (QoS) setting on the stack link ports 202a and 202b to compensate for that available (reduced) bandwidth.

Referring next to FIG. 9, in an embodiment of block 706 and in response to determining that the aggregated stacking links 314b and 314c are unavailable to transmit communications to the networking device 312a due to the unavailability of the networking device 312a, the stack link fault monitoring/response engine 504 in either or both of the networking devices 308a and/or 308b may operate to shut down their connected device ports that provide the links to the server devices 302 and 304, respectively, which operates to prevent the server devices 302 and 304 from sending communications through those links to the networking devices 308a and 310a, respectively (i.e., where those communications may otherwise be dropped due to the unavailable aggregated stacking links 314b and 314c.) For example, at block 706 the stack link fault monitoring/response engine 504 in the networking device 308a may access the stack link fault monitoring/response database 506 and determine, using the degraded/unavailable state of the aggregated stacking links 314c and/or 314b, that the stack link fault response action associated with that degraded/unavailable state is to shut down the connected device port that provides the link to the sever device 302. In response, the server devices 302 and 304 may operate to reroute their communications (which were being sent through the links to the networking devices 308a and 310a) so that they are subsequent sent to the networking devices 308b and 310b, respectively. As such, stack link fault response actions may include shutting down ports to connected devices so that those connected devices then operate to determine alternate paths for their communications in order direct communications away from the degraded/unavailable aggregated stacking link(s).

Similarly as discussed above, the networking devices 302 and 304 may include connected device priority assignments (i.e., stored in the stack link fault monitoring/response database 506) for any or all of their connected devices, and at block 706 the stack link fault monitoring/response engine 504 in each networking device 302 and 304 may operate to determine the relative priorities of its corresponding connected devices, which enables the stack link fault monitoring/response engine 504 to shut down subsets of its connected device ports that are connected to relatively lower priority connected devices. For example, the stack link fault monitoring/response engine 504 may determine an available bandwidth of an aggregated stacking link that includes at least one stack link that is degraded or unavailable, and then use that available bandwidth to determine a subset of its connected device ports (i.e., that are connected to relatively low priority connected devices) that must be shut down to enable continued communications by relatively high priority connected devices.

Similarly as discussed above, at block 706 and in response to the degradation or unavailability of the aggregated stacking link(s), the stack link fault monitoring/response engine 504 may send stack link fault message(s) to its connected device. For example, the stack link fault monitoring/response engine 504 in the networking device 308a may access the stack link fault monitoring/response database 506 and determine, using the degraded/unavailable state of the aggregated stacking links 314b and/or 314c, that the stack link fault response action associated with that degraded/unavailable state is to send a stack link fault message that causes the server device 302 to reroute its communications (i.e., to the networking device 308b) such that those communications are no longer sent through the link provided to the networking device 308a. As such, rather than shutting down connected device ports, networking devices may inform connected devices of degraded or unavailable stack link(s), and the stack link fault response engine 604 in those server devices 600 may utilize rerouting information stored in its stack link fault response database 606 to reroute its communications to avoid the degraded or unavailable aggregated stacking link(s). In specific examples, the server device 600 may identify the unavailable or degraded state of a stack link in the stack link fault message, and then access its stack link fault response database 606 to determine a stack link fault response action to perform based on that unavailable or degraded state. As such, server devices 600 may utilize a degraded state of a stack link (e.g., a reduced bandwidth) to perform a variety of actions such as, for example, rerouting lower priority communications away from the networking device that utilizes that degraded stack link, while continuing to send higher priority communications to the networking devices that utilizes that degraded stack link.

In another example, the stack link fault monitoring/response engine 504 in the networking device 308a may access the stack link fault monitoring/response database 506 and determine, using the degraded/unavailable state of the aggregated stacking links 314b and/or 314c, that the stack link fault response action associated with that degraded/unavailable state is to send a stack link fault message that causes the server device 302 to limit its advertisement of available services (i.e., to devices and/or subsystems connected to the server device 302) in order to generate fewer communications that are subsequent sent through the link to the networking device 308a. In specific examples, the server device 600 may identify the unavailable or degraded state of a stack link in the stack link fault message, and then access its stack link fault response database 606 to determine a stack link fault response action to perform that includes limiting its advertised services. The advertisement limiting functionality of the server devices in response to the stack link fault messages may be performed by itself, or in addition to the rerouting of communications by the server device while remaining within the scope of the present disclosure.

In some examples, rather than being completely unavailable, the networking device 312 may be experiencing reduced performance that is interpreted by the networking devices 308a, 310a, and/or 312a as degraded/unavailable aggregated stacking links 314b and 314c. In such examples, at block 706 the stack link fault monitoring/response engine 504 in the networking device 308a may access the stack link fault monitoring/response database 506 and determine, using the degraded/unavailable state of the aggregated stacking links 314b and/or 314c, that the stack link fault response action associated with that degraded/unavailable state is to determine an available (reduced) bandwidth for the networking device 312a using the degraded/unavailable aggregated stacking links 314b and 314c, and then run a script or change a Quality of Service (QoS) setting on the stack ports that provide access to the aggregated stacking links 314b and 314c to compensate for that available (reduced) bandwidth.

Referring next to FIG. 10A, in an embodiment of block 706 and in response to determining that a plurality of stack links in the aggregated stacking link 418a are unavailable to transmit communications to the networking device 404, the stack link fault monitoring/response engine 504 in the networking device 402 may operate to shut down its connected device ports that provide the link(s) 410 to the server devices 406a and/or 406b, respectively, which operates to prevent the server devices 406a and/or 406b from sending communications through those link(s) 410 to the networking device 402 (i.e., where those communications may otherwise be dropped due to the degraded aggregated stacking link 418a.) For example, at block 706 the stack link fault monitoring/response engine 504 in the networking device 402 may access the stack link fault monitoring/response database 506 and determine, using the degraded/unavailable state of the aggregated stacking link 418a, that the stack link fault response action associated with that degraded/unavailable state is to shut down the connected device port that provides one or more of the link(s) to the sever devices 406a and 406b. In response, the server devices 406a and/or 406b may operate to reroute their communications (which were being sent through the links 410 to the networking device 402) so that they are subsequent sent through the links 412 to the networking device 404, respectively. As such, stack link fault response actions may include shutting down ports to connected devices so that those connected devices then determine alternate paths for their communications in order direct communications away from the degraded/unavailable aggregated stacking link.

Figure 10B:
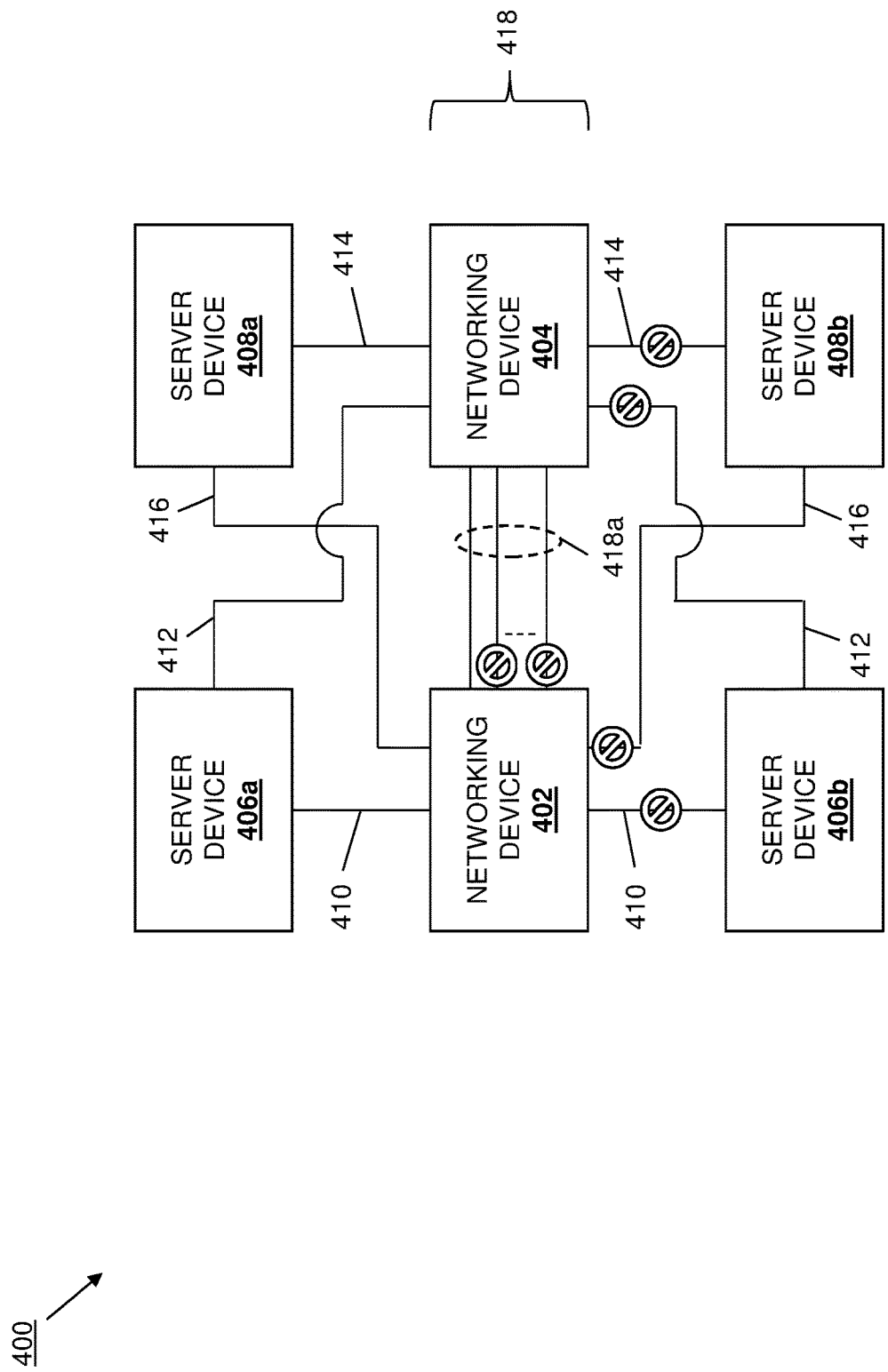
FIG. 10B is a schematic view of the stack link fault response system of FIG. 4 responding to the stack link fault illustrated in FIG. 10A.

FIG. 10B illustrates an example of how the networking devices 402 and 404 may operate according to connected device priority assignments (i.e., stored in the stack link fault monitoring/response database 506) to determine which connected device ports to shut down. For example, server devices 406a and 408a may be assigned higher priorities than the server devices 406b and 408b in both the networking devices 402 and 404, and at block 706 the stack link fault monitoring/response engine 504 in the networking devices 402 and 404 may access the stack link fault monitoring/response database 506 and determine, using the degraded/unavailable state of the aggregated stacking link 418a, that the stack link fault response action associated with that degraded/unavailable state is to determine the relative priorities of its corresponding connected devices 406a, 406b, 408a and 408b, which enables the stack link fault monitoring/response engine 504 in the networking device 402 to shut down its connected device ports that provide the links 410 and 416 to the lower priority connected device 406b and 408b, respectively, and enables the stack link fault monitoring/response engine 504 in the networking device 404 shut down its connected device ports that provide the links 412 and 414 to the lower priority connected device 406b and 408b respectively. In some examples, the stack link fault monitoring/response engine 504 in each networking device 402 and 404 may determine an available (reduced) bandwidth of the aggregated stacking link 418a, and then use that available (reduced) bandwidth to determine the subset of its connected device ports (i.e., that are connected to relatively low priority connected devices 406b and 408b) that must be shut down to enable continued communications by relatively high priority connected devices 406a and 408a.

Similarly as discussed above, at block 706 and in response to the degradation or unavailability of the stack links in the aggregated stacking link 418a, the stack link fault monitoring/response engine 504 in the networking devices 402 and 404 may access the stack link fault monitoring/response database 506 and determine, using the degraded/unavailable state of the aggregated stacking link 418a, that the stack link fault response action associated with that degraded/unavailable state is to send stack link fault message(s) to its connected device. For example, the stack link fault monitoring/response engine 504 in the networking device 402 may send the sever device 406b a stack link fault message that causes the server device 406b to reroute its communications (i.e., to the networking device 404) such that those communications are no longer sent through the link 410 provided to the networking device 402. As such, rather than shutting down connected device ports, networking devices may inform connected devices of degraded or unavailable stack link(s) in an aggregated stacking link, and the stack link fault response engine 604 in those server devices 600 may utilize rerouting information stored in its stack link fault response database 606 to reroute its communications to avoid the degraded or unavailable aggregated stacking link. In specific examples, the server device 600 may identify the unavailable or degraded state of a stack link in the stack link fault message, and then access its stack link fault response database 606 to determine a stack link fault response action to perform based on that unavailable or degraded state. As such, server devices 600 may utilize a degraded state of a stack link (e.g., a reduced bandwidth) to perform a variety of actions such as, for example, rerouting lower priority communications away from the networking device that utilizes that degraded stack link, while continuing to send higher priority communications to the networking devices that utilizes that degraded stack link.

In another example, the stack link fault monitoring/response engine 504 in the networking device 402 may access the stack link fault monitoring/response database 506 and determine, using the degraded/unavailable state of the aggregated stacking link 418a, that the stack link fault response action associated with that degraded/unavailable state is to send the sever device 406b a stack link fault message that causes the server device 406b to limit its advertisement of available services (i.e., to devices and/or subsystems connected to the server device 406b) in order to generate fewer communications that are subsequent sent through the link to the networking device 402. In specific examples, the server device 600 may identify the unavailable or degraded state of a stack link in the stack link fault message, and then access its stack link fault response database 606 to determine a stack link fault response action to perform that includes limiting its advertised services. The advertisement limiting functionality of the server devices in response to the stack link fault messages may be performed by itself, or in addition to the rerouting of communications by the server device while remaining within the scope of the present disclosure.

Figure 11B:
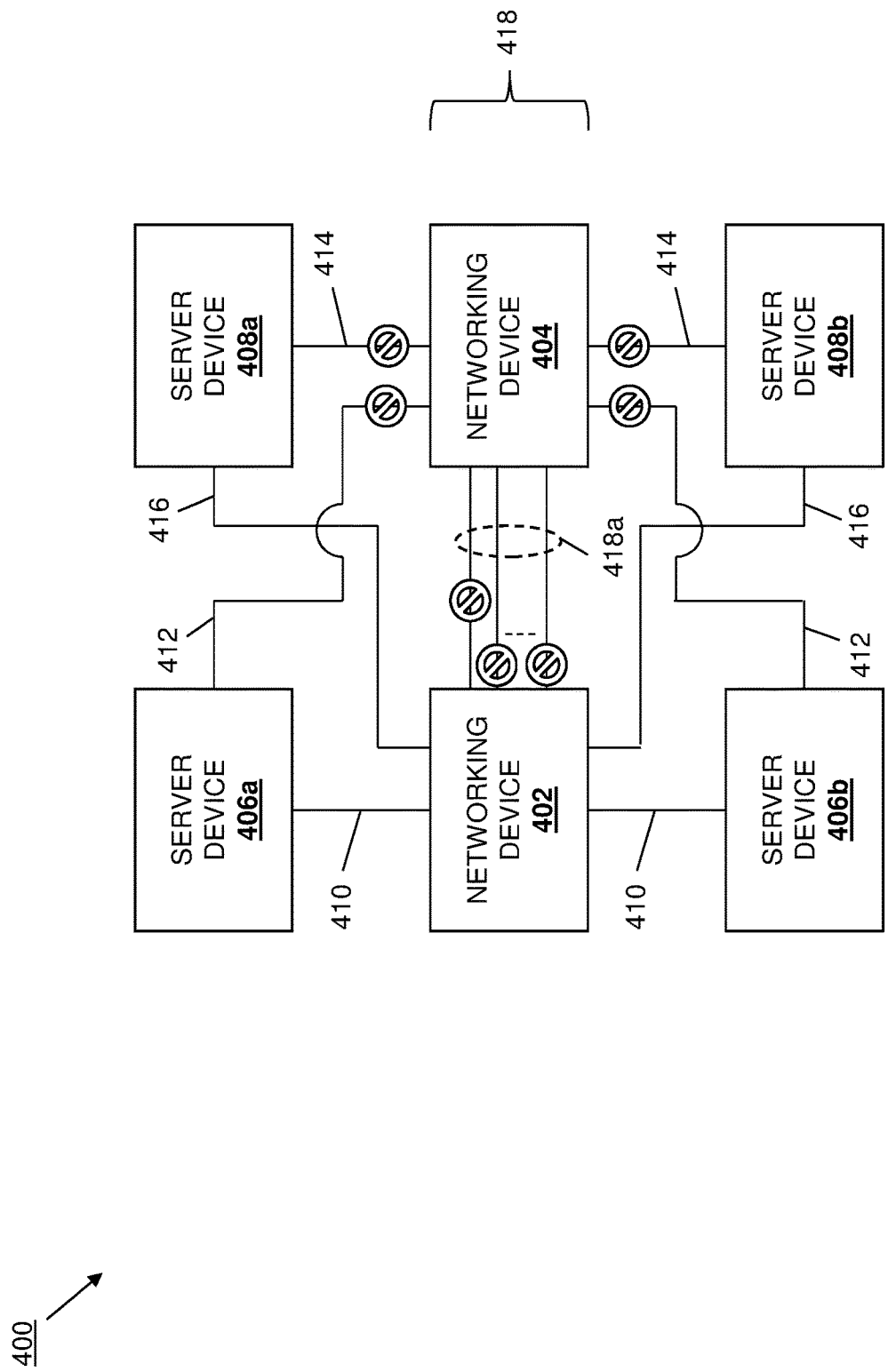
FIG. 11B is a schematic view of the stack link fault response system of FIG. 4 responding to the stack link fault illustrated in FIG. 11A.

In some examples, at block 706 the stack link fault monitoring/response engine 504 in the networking device 308a may access the stack link fault monitoring/response database 506 and determine, using the degraded/unavailable state of the aggregated stacking link 418a, that the stack link fault response action associated with that degraded/unavailable state is to determine an available (reduced) bandwidth using the available stack links in the aggregated stacking link 418a, and then run a script or change a Quality of Service (QoS) setting on the stack ports that provide access to the aggregated stacking link 418a to compensate for that available (reduced) bandwidth In another example, with reference to FIGS. 11A and 11B, the networking device 402 may be designated the master of the stacked networking device system 418, while the networking device 404 may be designated as a member of the stacked networking device system 418. At block 706 and in response to the aggregated stacking link 418a being unavailable (e.g., all of the stack links in the aggregated stacking link 418a being unavailable), the stack link fault monitoring/response engine 504 in the networking device 404 may operate to cause each of its connected device ports that provides the links 412 and 414 to the server devices 406a, 406b, 408a, and 408b to shut down (as illustrated in FIG. 11B), which operates to cause services being provided on the networking device 404 to fail over to the networking device 402 (the master of the stacked networking device system 418) such that the networking device 402 operates to provide all the services (some of which were previously provided by the networking device 404) to the server devices 406a, 406b, 408a, and 408 using the links 410 and 416.

The method 700 then may proceed to optional block 708 where the first networking device instructs a second networking device to perform at least one stack link fault response action that causes at least a portion of the first connected device communications generated by the first connected device to not be sent to the second networking device. As discussed below, rather than operating individually, networking devices may cooperate to address degraded aggregated stacking links and degraded/unavailable stack links. For example, with reference to FIGS. 10A and 10B, at block 708 the stack link fault monitoring/response engine 504 in the networking device 402 may communicate with the stack link fault monitoring/response engine 504 the networking devices 404 (e.g., over the degraded aggregated stacking link 418a) in order to cause the server devices 406b and 408b to cease sending communications through the links 410, 412, 414 and 416 provided between the networking devices 402 and 404 and the server devices 406b and 408b. As such, the server device 406b may be providing communications to each of the networking devices 402 and 404 (via the links 410 and 412, respectively), and the stack link fault monitoring/response engines 504 in each of the networking devices 402 and 404 may cooperate to perform stack link fault response actions that shut down connected device ports, send stack link fault messages, and/or perform any of the other functionality discussed above. While a specific example of coordinate networking device functionality has been provided, one of skill in the art in possession of the present disclosure will recognize how coordinated action between the networking devices may provide other benefits that will fall within the scope of the present disclosure as well.

The method 700 then may proceed to optional block 710 where each networking device in a stacked networking system performs at least one stack link fault response action that causes connected device communications generated by connected device to not be sent to the stacked networking device system. For example, in the embodiment illustrated in FIG. 9, the networking device stacking system 314 may operate to handle a first type of data (e.g., Virtual Storage Area Network (VSAN) data) for the server devices 302-306 while being configured to provide backup handling of a second type of data (e.g., Virtual Machine (VM) transport data such as VMOTION® data utilized with VMWARE® systems) for the server devices 302-306, while the networking device stacking system 316 may operate to handle the second type of data for the server devices 302-306 while being configured to provide backup handling of the first type of data for the server devices 302-306. As would be understood by one of skill in the art in possession of the present disclosure, the failure of the networking device 312a in such an embodiment would cause the server device 306 to send the first type of data to the networking device 312b, where it would be isolated (as the other networking devices 308b and 310b would still be handling only the second type of data for the server devices 302 and 304. However, at block 710, the networking devices 308a and 310a may detect the unavailability of the networking device 312a and, in response, shut down their respective connected device port (s) to the server devices 302 and 304 to cause those server devices 302 and 304 to send the first type of data to the networking devices 308b and 310b as well, thus enabling the networking device stacking system 316 to handle both the first type of data and the second type of data for the server devices 302-306, and preventing the isolation of the first type of data sent by the server device 306 to the networking device 312b (due to the unavailability of the networking device 312a.)

Thus, systems and methods have been described that provide for dynamic monitoring of an aggregated stacking link to allow for the classification of the aggregated stacking link in various intermediate degraded states (i.e., rather than "up" or "down"), which allows stack link fault response actions to be performed to prevent or limit communications from connected devices from being dropped or otherwise impeded. As discussed above, networking devices may assign ports connected to different connected devices with different priorities, and then shut down ports to relatively lower priority connected devices when the aggregated stacking link is degraded, which may cause those connected devices to reroute their communications such that they are no longer sent to the networking device(s) utilizing the degraded aggregated stacking link. As also discussed above, networking devices may inform connected devices when the aggregated stacking link is degraded, and those connected devices may then operate to reroute their communications (e.g., without the need to shut down its connected device port) such that they are no longer sent to the networking device(s) utilizing the degraded aggregated stacking link. As also described above, multiple networking devices may cooperate to perform stack link fault response actions that reduce the amount of traffic sent to the networking device(s) utilizing the degraded aggregated stacking link, and may coordinate to reroute particularly types of communication to a different stacked networking device system in order to ensure that no portion of those communications become isolated. As such, the operation of the stacked networking device systems of the present disclosure is improved over conventional stacked networking device system due to the ability to adjust communications for degraded, but at least partially operational, aggregated stacking links between networking devices. For example, communications may be adjusted for an aggregated stacking link that only includes a single available stack link (i.e., when all of its other stack links have become unavailable) so that as many essential communications as possible are transmitted using the bandwidth or other performance available via the single available stack link.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A stack link fault response system, comprising:
 a connected device;
 a first networking device; and
 a second networking device that is coupled to the connected device by at least one first connected device link, and that is coupled to the first networking device by a plurality of stack links, wherein the second networking device is configured to:

transmit, using at least one of the plurality of stack links, stack communications that are based on connected device communications received through the at least one first connected device link from the connected device;

determine that a subset of the plurality of stack links are unavailable to transmit the stack communications while at least one of the plurality of stack links that is not included in the subset of the plurality of stack links is available to transmit the stack communications; and perform, in response to determining that the subset of the plurality of stack links are unavailable to transmit the stack communications while the at least one of the plurality of stack links that is not included in the subset of the plurality of stack links is available to transmit the stack communications, at least one stack link fault response action that is configured to prevent the connected device from sending a portion of the connected device communications through the at least one first connected device link to the second networking device in order to reduce the stack communications transmitted on the at least one of the plurality of stack links that is not included in the subset of the plurality of stack links.

2. The system of claim 1, wherein the at least one stack link fault response action includes:
shutting down each first connected device port on the second networking device that provides the at least one first connected device link to the connected device.

3. The system of claim 2, wherein the at least one stack link fault response action includes:
determining that each first connected device port on the second networking device that provides the at least one first connected device link to the connected device is assigned a lower priority than at least one second connected device port on the second networking device and, in response, shutting down each first connected device port.

4. The system of claim 1, wherein the at least one stack link fault response action includes:
sending, through the at least one first connected device link to the connected device, a stack link fault message that is configured to prevent the connected device from sending at least a portion of the connected device communications through the at least one first connected device link to the second networking device.

5. The system of claim 4, wherein stack link fault message is configured to cause the connected device to limit its advertisement of available services.

6. The system of claim 1, wherein the first networking device is coupled to the connected device by at least one second connected device link, and wherein the at least one stack link fault response action includes:
sending, to the first networking device using the at least one of the plurality of stack links that is not included in the subset of the plurality of stack links and that is available to transmit the stack communications, a stack link fault message that is configured to cause the first networking device to shut down each second connected device port on the first networking device that provides the at least one second connected device link to the connected device.

7. An Information Handling System (IHS), comprising:
at least one first connected device port that is configured to couple to a connected device;
a plurality of stack ports that are configured to couple to at least one networking device;
a processing system that is coupled to the at least one first connected device port and the plurality of stack ports; and
a memory system that is coupled to the processing system and that includes instructions that, when executed by the processing system, cause the processing system to provide a stack link fault response engine that is configured to:
transmit, using at least one of a plurality of stack links provided by the plurality of stack ports, stack communications that are based on connected device communications received through the at least one first connected device port from the connected device;

determine that a subset of the plurality of stack links are unavailable to transmit the stack communications while at least one of the plurality of stack links that is not included in the subset of the plurality of stack links is available to transmit the stack communications; and perform, in response to determining that the subset of the plurality of stack links are unavailable to transmit the stack communications while the at least one of the plurality of stack links that is not included in the subset of the plurality of stack links is available to transmit the stack communications, at least one stack link fault response action that is configured to prevent the connected device from sending a portion of the connected device communications to the at least one first connected device port in order to reduce the stack communications transmitted on the at least one of the plurality of stack links that is not included in the subset of the plurality of stack links.

8. The IHS of claim 7, wherein the at least one stack link fault response action includes:
shutting down each at least one first connected device port that that is coupled to the connected device.

9. The IHS of claim 8, further comprising:
at least one second connected device port that is coupled to the processing system, wherein the at least one stack link fault response action includes:
determining that each at least one first connected device port that is coupled to the connected device is assigned a lower priority than the at least one second connected device port and, in response, shutting down each at least one first connected device port.

10. The IHS of claim 7, wherein the at least one stack link fault response action includes:
sending, through the at least one first connected device port to the connected device, a stack link fault message that is configured to prevent the connected device from sending at least a portion of the connected device communications to the at least one first connected device port.

11. The IHS of claim 10, wherein stack link fault message is configured to cause the connected device to limit its advertisement of available services.

12. The IHS of claim 7, wherein the at least one stack link fault response action includes:
sending, to the at least one networking device using the at least one of the plurality of stack links that is not included in the subset of the plurality of stack links that is available to transmit the stack communications, a stack link fault message that is configured to cause the at least one networking device to shut down each second connected device port that provides at least one second connected device link to the connected device.

13. The IHS of claim 7, wherein the plurality of stack ports are configured to couple to the at least one networking device to provide at least part of a stacked networking device system that is configured to transmit a first type of data, and wherein the at least one stack link fault response action includes:
sending, to each networking device in the stacked networking device system using the at least one of the plurality of stack links that is not included in the subset of the plurality of stack links and that is available to transmit the stack communications, a stack link fault message that is configured to cause each of the networking devices in the stacked networking device system to shut down its ports that receive the first type of data.

14. A method for responding to stack link faults, comprising:
transmitting, by a first networking device using at least one of a plurality of stack links to a second networking device, stack communications that are based on connected device communications received through at least one first connected device link from a connected device;
determining, by the first networking device, that a subset of the plurality of stack links are unavailable to transmit the stack communications while at least one of the plurality of stack links that is not included in the subset of the plurality of stack links is available to transmit the stack communications; and
performing, by the first networking device in response to determining that the subset of the plurality of stack links are unavailable to transmit the stack communications while the at least one of the plurality of stack links that is not included in the subset of the plurality of stack links is available to transmit the stack communications, at least one stack link fault response action that is configured to prevent the connected device from sending a portion of the connected device communications through the at least one first connected device link to the first networking device in order to reduce the stack communications transmitted on the at least one of the plurality of stack links that is not included in the subset of the plurality of stack links.

15. The method of claim 14, wherein the at least one stack link fault response action includes:
shutting down each first connected device port on the first networking device that provides the at least one first connected device link to the connected device.

16. The method of claim 15, wherein the at least one stack link fault response action includes:
determining that each first connected device port on the first networking device that provides the at least one first connected device link to the connected device is assigned a lower priority than at least one second connected device port on the first networking device and, in response, shutting down each first connected device port.

17. The method of claim 14, wherein the at least one stack link fault response action includes:
sending, through the at least one first connected device link to the connected device, a stack link fault message that is configured to prevent the connected device from sending at least a portion of the connected device communications through the at least one first connected device link to the first networking device.

18. The method of claim 17, wherein stack link fault message is configured to cause the connected device to limit its advertisement of available services.

19. The method of claim 14, wherein the second networking device is coupled to the connected device by at least one second connected device link, and wherein the at least one stack link fault response action includes:
sending, to the second networking device using the at least one of the plurality of stack links that is not included in the subset of the plurality of stack links that is available to transmit the stack communications, a stack link fault message that is configured to cause the second networking device to shut down each second connected device port on the second networking device that provides the at least one second connected device link to the connected device.

20. The method of claim 14, wherein the plurality of stack links are coupled to the second networking device to provide at least part of a stacked networking device system that is configured to transmit a first type of data, and wherein the at least one stack link fault response action includes:
sending, to each networking device in the stacked networking device system using the at least one of the plurality of stack links that is not included in the subset of the plurality of stack links and that is available to transmit the stack communications, a stack link fault message that is configured to cause each of the networking devices in the stacked networking device system to shut down its ports that receive the first type of data.

* * * * *